(12) United States Patent
Johnson

(10) Patent No.: US 8,473,901 B1
(45) Date of Patent: Jun. 25, 2013

(54) NON-LITERAL REPRESENTATION OF PROGRAMMING LANGUAGE CODE

(75) Inventor: Steve Johnson, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 978 days.

(21) Appl. No.: 12/483,922

(22) Filed: Jun. 12, 2009

(51) Int. Cl.
*G06F 9/44* (2006.01)

(52) U.S. Cl.
USPC ........... 717/110; 717/106; 717/108; 717/114; 717/131

(58) Field of Classification Search
USPC .................. 717/103–113, 106–114, 131–158
See application file for complete search history.

(56) References Cited

U.S. PATENT DOCUMENTS

| | | | |
|---|---|---|---|
| 6,262,729 B1 * | 7/2001 | Marcos et al. | 715/744 |
| 6,851,107 B1 * | 2/2005 | Coad et al. | 717/108 |
| 7,340,721 B1 * | 3/2008 | Bailey | 717/109 |
| 7,765,532 B2 * | 7/2010 | Dutt et al. | 717/149 |
| 7,849,440 B1 * | 12/2010 | Englehart | 717/106 |
| 8,255,872 B2 * | 8/2012 | Vampo et al. | 717/113 |
| 2004/0019875 A1 * | 1/2004 | Welch | 717/109 |
| 2007/0022408 A1 * | 1/2007 | Brandt et al. | 717/136 |
| 2010/0017788 A1 * | 1/2010 | Bronkhorst et al. | 717/125 |

OTHER PUBLICATIONS

Anantha et al., Code Compaction for Parallel Architectures, Software-Practice and Experience, Jun. 1990, vol. 20(6), pp. 537-554.*
Sloane et al., Beyond Traditional Program Slicing, 1996 ACM, pp. 180-186.*
Vestal, Mode Changes in a Real-Time Architecture Description Language, 1994, IEEE, pp. 136-146.*

* cited by examiner

*Primary Examiner* — Wei Zhen
*Assistant Examiner* — Satish Rampuria
(74) *Attorney, Agent, or Firm* — Nelson Mullins Riley & Scarborough LLP

(57) ABSTRACT

Exemplary embodiments may provide methods, systems and devices for providing non-literal representations of programming language code. The non-literal representation of a portion of code may provide a representation of the semantics of the portion of code that is different from the source code representation. The non-literal representation may change the way the code is output to a user in order to improve readability of the source code, and may not modify the underlying structure or semantics of the code. While improving readability of the code, the non-literal representation may also retain important information about the underlying code associated with the non-literal representation.

62 Claims, 37 Drawing Sheets

```
function [a,b] = example( x, y, z )
  global debug
  if debug
    fprintf( 'Call: example(%d,%d,%d)\n', x, y, z );
  end
  a = 0;
  b = 0;
  if x < y a = x;
    b = y;
    temp = y;        200
    y = x;
    x = temp + 1;

end
  if y < z
    a = y;
    b = z;           202
    temp = z;
    z = y;
    y = temp + 1;
  end
  if x < z
    a = x;
    b = z;           204
    temp = z;
    z = x;
    x = temp + 1;
  end
  if debug
    fprintf( 'Return: example = %d, %d\n', a, b );
  end
end
```

*Fig. 2A*

```
function [a,b] = example( x, y, z )
   global debug
   if debug
      fprintf( 'Call: example(%d,%d,%d)\n', x, y, z );
   end
   a = 0;
   b = 0;
   if x < y
      [a, b, x, y] = swap_and_add (x, y);    206
   end
   if y < z
      [a, b, y, z] = swap_and_add (y, z);    208
   end
   if x < z
      [a, b, x, z] = swap_and_add (x, z);    210
   end
   if debug
      fprintf( 'Return: example = %d, %d\n', a, b );
   end
end
```

*Fig. 2B*

```
function [a,b] = example( x, y, z )
   global debug
   if debug
      fprintf( 'Call: example(%d,%d,%d)\n', x, y, z );
   end
   a = 0;
   b = 0;
   if x < y
      swap_and_add-uses: x, y; sets: x, y, a, b;      212
   end
   if y < z
      swap_and_add-uses: y, z; sets: a, b, y, z;      214
   end
   if x < z
      swap_and_add-uses x, z; sets: a, b, x, z;       216
   end
   if debug
      fprintf( 'Return: example = %d, %d\n', a, b );
   end
end
```

*Fig. 2C*

```
function [a,b] = example( x, y, z )
    global debug
    if debug
        fprintf( 'Call: example(%d,%d,%d)\n', x, y, z );
    end
    a = 0;
    b = 0;
    if x < y
        a = x;                      228
        b = y;
        temp = y;
        y = x;
        x = temp + 1;
    end
    if y < z
        a = y;                      230
        b = z;
        temp = z;
        z = y;
        y = temp + 1;
    end
    if x < z
        a = x;                      232
        b = z;
        temp = z;
        z = x;
        x = temp + 1;
    end
    if debug
        fprintf( 'Return: example = %d, %d\n', a, b );
    end
end
```

*Fig. 2E*

```
function [a,b] = example( x, y, z )
   global debug
   if debug
      fprintf( 'Call: example(%d,%d,%d)\n', x, y, z );
   end
   a = 0;
   b = 0;
   if x < y
      <variable setting code> [a, b, x, y] =
234   swap_and_add (x, y); <variable setting code>
   end
   if y < z
236   variable setting code: [a, b, y, z] =
      swap_and_add (y, z);
   end
   if x < z
238   [a, b, x, z] = swap_and_add (x, z);
   end
   if debug
      fprintf( 'Return: example = %d, %d\n', a, b );
   end
end
```

240 — variable setting code

*Fig. 2F*

```
function [a,b] = example( x, y, z )
    global debug
    if debug
        fprintf( 'Call: example(%d,%d,%d)\n', x, y, z );
    end
    a = 0;
    b = 0;
    if x < y
        [a, b, x, y] = swap_and_add (x, y);    242
    end
    if y < z
        [a, b, y, z] = swap_and_add (y, z);    244
    end
    if x < z
        [a, b, x, z] = swap_and_add (x, z);    246
    end
    if debug
        fprintf( 'Return: example = %d, %d\n', a, b );
    end
end
```

*Fig. 2G*

```
function [a,b] = example( x, y, z )
  global debug
  if debug
    fprintf( 'Call: example(%d,%d,%d)\n', x, y, z );
  end
  a = 0;
  b = 0;
  if x < y
    [a, b, x, y] = swap_and_add (x, y);    254
  end
  if y < z
    a = y;
    b = z;                                  202
    temp = z;
    z = y;
    y = temp + 1;
  end
  if x < z
    [a, b, x, z] = swap_and_add (x, z);    256
  end
  if debug
    fprintf( 'Return: example = %d, %d\n', a, b );
  end
end
```

```
function [a,b] = example( x, y, z )
   global debug
   if debug
      fprintf( 'Call: example(%d,%d,%d)\n', x, y, z );
   end
   a = 0;
   b = 0;
   if x < y                    258                         260
      [a, b, x, y] = swap_and_add (x, y);              a = x;
   end                                                 b = y;
   if y < z                                            temp = y;
      [a, b, y, z] = swap_and_add (y, z);              y = x;
   end                                                 x = temp + 1;
   if x < z
      [a, b, x, z] = swap_and_add (x, z);
   end
   if debug
      fprintf( 'Return: example = %d, %d\n', a, b );
   end
end
```

*Fig. 2I* function example( x, y, z )        500 debugging block if block 502 if block 504 if block 506 debugging block

*Fig. 5*

```
function ret = mywindow(data,filterName)
%MYWINDOW Applies the window specified on
    the data.
%
% Get the length of the data.
N= length(data);
% List all the possible windows.
% Note the list of functions in the following function
    pragma is
% on a single line of code.
```

600 
```
%#function bartlett, barthannwin, blackman,
    blackmanharris, bohmanwin, chebwin,
    flattopwin, gausswin, hamming, hann, kaiser,
    nuttallwin, parzenwin, rectwin, tukeywin,
    triang window = feval(filterName,N);
% Apply the window to the data.
ret = data.*window;
```

*Fig. 6A*

```
function ret = mywindow(data,filterName)
%MYWINDOW Applies the window specified on
    the data.
%
% Get the length of the data.
N= length(data);
% List all the possible windows.
% Note the list of functions in the following function
    pragma is
% on a single line of code.
```

602  `compile_necessary_functions;`

```
window = feval(filterName,N);
% Apply the window to the data.
ret = data.*window;
```

*Fig. 6B*

*900* line 9:13         [a, b, x, y] = swap_and_add (x, y);   *906*

*902* line 16:20        [a, b, y, z] = swap_and_add (y, z);   *908*

*904* line 23:27        [a, b, x, z] = swap_and_add (x, z);   *910*

*Fig. 9*

*1000* Developer A      full_view_of_source_code      *1004*

*1002* Developer B      no_view_of_source_code      *1006*

*Fig. 10*

```
function [a,b] = example( x, y, z )
    global debug
    if debug
        fprintf( 'Call: example(%d,%d,%d)\n', x, y, z );    1100
    end
    a = 0;
    b = 0;
    if x < y
        [a, b, x, y] = swap_and_add (x, y);
    end
    if y < z
        [a, b, y, z] = swap_and_add (y, z);
    end
    if x < z
        [a, b, x, z] = swap_and_add (x, z);
    end
    if debug
        fprintf( 'Return: example = %d, %d\n', a, b );    1102
    end
end
```

*Fig. 11A*

```
function [a,b] = example( x, y, z )
   debug_in      1104
   a = 0;
   b = 0;
   if x < y
      [a, b, x, y] = swap_and_add (x, y);
   end
   if y < z
      [a, b, y, z] = swap_and_add (y, z);
   end
   if x < z
      [a, b, x, z] = swap_and_add (x, z);
   end
   debug_out    1106
end
```

*Fig. 11B*

```
function [a,b] = example( x, y, z )
   a = 0;
   b = 0;
   if x < y
      [a, b, x, y] = swap_and_add (x, y);
   end
   if y < z
      [a, b, y, z] = swap_and_add (y, z);
   end
   if x < z
      [a, b, x, z] = swap_and_add (x, z);
   end
end
```

*Fig. 11C*

```
function [m, n] = foo (p, q, r)
   ....
   a = 0;
   b = 0;
   if x < y
      a = x;
      b = y;
      temp = y;
      y = x;
      x = temp + 1;
   end
   [m, n] = [a, b]
   ...
end
```

*Fig. 12A*

```
function [m, n] = foo (p, q, r)
   ....
   [m, n] = bar (p, q, r)
   ...
end function [a, b] = bar (x, y, z)
   a = 0;
   b = 0;
   if x < y
      a = x;
      b = y;
      temp = y;
      y = x;
      x = temp + 1;
   end
end
```

*Fig. 12B*

```
function [m, n] = foo (p, q, r)
   ....
   [a, b, x, y] = swap_and_add (x, y);

...
end
```

*Fig. 12C*

```
function [m, n] = foo (p, q, r)
   ....
   [m, n] = bar (p, q, r)
   ...
end function [a, b] = bar (x, y, z)
   a = 0;
   b = 0;
   if x < y
      a = x;
      b = y;
      temp = y;
      y = x;
      x = temp + 1;
   end
end
```

*Fig. 13A*

```
function [m, n] = foo (p, q, r)
    ....
    a = 0;
    b = 0;
    if x < y
        a = x;
        b = y;
        temp = y;
        y = x;
        x = temp + 1;
    end
    [m, n] = [a, b]
    ...
end
```

*Fig. 13B*

```
function [m, n] = foo (p, q, r)
    ….
    a = 0;
    b = 0;
    if x < y
        [a, b, x, y] = swap_and_add (x, y)
    end
    [m, n] = [a, b]
    …
end
```

*Fig. 13C*

```
function [a, b] = foo (x, y, z)
   a = 0;
   b = 0;
   if x < y
      a = x;
      b = y;
      temp = y;
      y = x;
      x = temp + 1;
   end
end
```

*Fig. 14A*

```
function [a, b] = foo (x, y, z)
   a = 0;
   b = 0;
   if x < y
      [a, b, x, y] = swap_and_add (x, y);
   end
end
```

*Fig. 14B*

```
function [p, q] = bar (r, s, t)
   a = 1;
   b = 1;
   if r < s
      .................
   end
end
```

*Fig. 14C*

```
function [c, d] = new_function (i, j, k)
    c = i;
    d = j;
    temp = j;
    j = i;
    i = temp + 1;
end
```

*Fig. 14D*

```
function [a, b] = foo (x, y, z)
   a = 0;
   b = 0;
   if x < y
      [a, b] = new_function (x, y, z);
   end
end function [p, q] = bar (r, s, t)
   a = 1;
   b = 1;
   if r < s
      [p, q] = new_function (r, s, t);
   end
end
```

*Fig. 14E*

```
function [a, b] = foo (x, y, z)
    a = 0;
    b = 0;
    if x < y
        a = x;
        b = y;
        temp = y;
        y = x;
        x = temp + 1;
    end
end function [p, q] = bar (r, s, t)
    a = 1;
    b = 1;
    if r < s
        a = r;
        b = s;
        temp = s;
        s = r;
        r = temp + 1;
    end
end
```

*Fig. 14F*

```
function [a, b] = foo (x, y, z)
   a = 0;
   b = 0;
   if x < y
      [a, b, x, y] = swap_and_add (x, y);
   end
end function [p, q] = bar (r, s, t)
   a = 1;
   b = 1;
   if r < s
      [a, b, r, s] = swap_and_add (r, s);
   end
end
```

*Fig. 14G*

NON-LITERAL REPRESENTATION OF PROGRAMMING LANGUAGE CODE

BACKGROUND

Large and complicated programming language code can be difficult to understand and difficult to modify for debugging and extension. A number of conventional techniques are used to organize and structure programming language code to make the code easier to understand and easier to modify. However, these conventional techniques of organizing and structuring code have drawbacks. For example, some of these techniques hide important information on the semantics of the code, while others tend to make code compilation more time-intensive.

BRIEF DESCRIPTION OF THE DRAWINGS

FIG. 2A illustrates source code with three portions identified for output in non-literal representations;

FIG. 2B illustrates an output of the source code of FIG. 2A in which the identified portions are output as mock function calls;

FIG. 2C illustrates an output of the source code of FIG. 2A in which the identified portions are output as textual descriptions of the underlying source code;

FIG. 2E illustrates an output of the source code of FIG. 2A in which the identified portions are output as condensed versions of the underlying source code;

FIG. 2F illustrates an output of the source code of FIG. 2A in which the identified portions are output as non-literal representations that include tags;

FIG. 2G illustrates an output of the source code of FIG. 2A in which the identified portions are output as mock function calls;

FIG. 2H illustrates an output of the source code of FIG. 2A in which the identified portions are output as non-literal representations that include a toggle option;

FIG. 2I illustrates an output of the source code of FIG. 2A in which the identified portions are output as non-literal representations that can include underlying source code output;

FIG. 5 illustrates a listing of programming units in the source code of FIG. 2A;

FIG. 6A illustrates source code including a pragma;

FIG. 6B illustrates an output of the source code of FIG. 6A in which the pragma is output as a non-literal representation;

FIG. 9 illustrates an exemplary mapping file that contains information on non-literal representations of the source code of FIG. 2A;

FIG. 10 illustrates an exemplary configuration file for configuring non-literal representations of source code;

FIG. 11A illustrates debugging source code with two portions identified for output in non-literal representations;

FIG. 11B illustrates an output of the debugging source code of FIG. 11A in which the identified portions are output as one-line textual descriptions of the underlying source code;

FIG. 11C illustrates an output of the debugging source code of FIG. 11A in which the identified portions of the debugging code are suppressed or deleted from the output;

FIG. 12A illustrates source code for a first function foo;

FIG. 12B illustrates source code for a second function bar and for refactored source code for the function foo in which foo calls bar;

FIG. 12C illustrates an output of the function foo of FIG. 12B in which the callsite of the function bar is output as a non-literal representation;

FIG. 13A illustrates source code for a first function foo and a second function bar, in which foo calls bar;

FIG. 13B illustrates source code for reverse refactored source code for the function foo of FIG. 13A in which bar is incorporated within foo;

FIG. 13C illustrates an output of the source code of FIG. 13B in which the reverse refactored portion of bar within foo is output in a non-literal representation;

FIG. 14A illustrates source code for a first function foo with a identified portion for output in non-literal representation;

FIG. 14B illustrates an output of the source code of FIG. 14A in which the identified portion is output as a mock function call;

FIG. 14C illustrates an output of source code in which a second function bar reuses the non-literal representation of FIG. 14B at the dotted location;

FIG. 14D illustrates an output of a new function new_function created by refactoring the portion of the first function foo identified in FIG. 14B;

FIG. 14E illustrates an output of the source code for the first function foo and the second function bar after the functions are modified to call the new function new_function of FIG. 14D;

FIG. 14F illustrate an output of the source code for the first function foo and the second function bar after bar is modified to incorporate the portion of foo identified in FIG. 14B;

FIG. 14G illustrates an output of the source code of FIGS. 14E and 14F in which the reused portion of code in functions foo and bar are output as a non-literal representation;

DETAILED DESCRIPTION

Overview of Exemplary Embodiments

Figure 1:
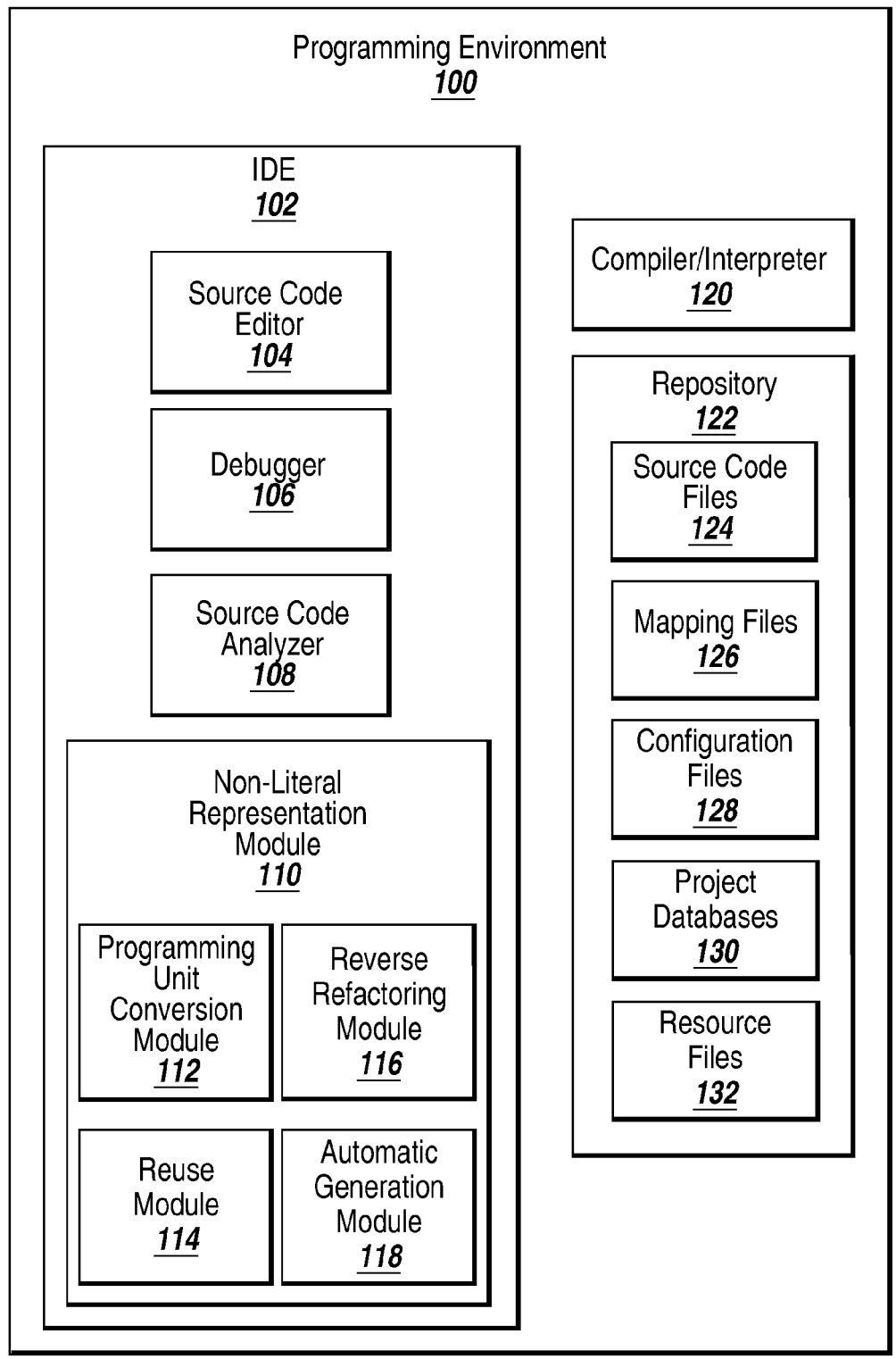
FIG. 1 illustrates a high-level block diagram of a programming environment in which exemplary embodiments are provided as a part of an integrated development environment (IDE)

Exemplary embodiments may provide methods, systems and devices for providing non-literal representations of source code. A non-literal representation of a portion of code is different from the source code representation and represents at least the semantics of the portion of code. Exemplary embodiments may allow identification of one or more portions of source code, and may output the identified portions as non-literal representations on an output means. For example, the non-literal representations of the source code may be output when a user wishes to view a source code listing. The non-literal representations may be more readily understood by a user than the actual source code that the non-literal representations represent. By providing non-literal representations of source code, exemplary embodiments may improve readability of complicated source code without making the code clumsy.

A non-literal representation may change the way the code is output to a user in order to improve readability of the code; however, exemplary embodiments may choose not to modify the underlying structure or semantics of the code. For example, non-literal representations may not add or remove programming units, like classes, methods or functions. Similarly, non-literal representations may not restructure or edit programming units in the source code. As such, the hierarchy, efficiency and/or ease of maintenance in the source code may not be degraded in exemplary embodiments. Exemplary embodiments may allow a user to identify which portions of code are to be represented in non-literal representations and the content of the non-literal representations.

In contrast, conventional techniques can create new programming units, which may increase the difficulty of maintaining and extending the code. For example, code refactoring is a conventional technique that changes a program's internal structure without modifying its external behavior or existing functionality. In one aspect, code refactoring involves converting code within an existing programming unit into a new programming unit, e.g. class, method, function, etc. However, since code refactoring adds new programming units to the code, this technique may increase the difficulty of maintaining and modifying the refactored code.

The MATLAB programming environment, in common with other dynamic languages, uses a search path to resolve the names of functions and classes when executive. This path may pose problems for a programmer when attempting to perform conventional refactoring, i.e. when converting code within an existing programming unit to a new programming unit. Since refactoring cannot always be performed satisfactorily in dynamically-typed environments like the MATLAB environment, non-literal representations provide a more robust solution, as compared to conventional techniques, for organizing, structuring and formatting code, and may be used uniformly in different programming environments.

Exemplary embodiments provide still other improvements as compared to conventional techniques for organizing and restructuring code. For example, exemplary embodiments may not modify the size of the compiled program or the time required for compiling the program. In contrast, the conventional technique of inlining allows certain functions or methods to be expanded into functions or methods that call them. Inlining allows time-critical operations to be performed without incurring the cost of function call overhead. However, inlining can also lead to a rapid increase in the size of compiled programs and the time required to compile the programs.

Non-literal representations provided by exemplary embodiments may retain important information about the underlying source code. Examples of this information can include, but are not limited to, one or more inputs and/or outputs of the underlying source code, a name for the representation, a tag describing the task performed by the underlying source code, etc. The information may also include additional information appropriate for the underlying source code, the underlying application, or the programming language, e.g. exceptions which may be thrown by the underlying source code. In some exemplary embodiments, the information may be integrated with the non-literal representations. In other embodiments, the information may be provided separately from the non-literal representations.

Terminology

For purposes of the discussion below, it is helpful to clarify some terminology that will be used herein.

Source code can refer to a collection of statements or declarations that allows a programmer to communicate with a computing device, e.g. a computer. Source code may be written in a human-readable computer programming language. The terms "source code," "programming language code" and "code" are used interchangeably herein. Non-literal representation of code can refer to a representation of at least the semantics of the code that is different from its source code representation. For example, a non-literal representation may represent the semantics, structure, hierarchy, etc, of the code, without being a literal duplication of the source code. Exemplary formats of non-literal representations include, but are not limited to, a textual description of the underlying code, a symbolic representation of the structure and/or semantics of the underlying code, a mock call to a fake programming unit, etc.

Underlying code of a non-literal representation can refer to the portion of the code that is associated with the non-literal representation.

Output means can refer to hardware for outputting code or computer-implemented means for outputting code on an output device. Examples of output devices include, but are not limited to, a display device (like a computer screen or monitor), a printing device, a storage device, etc. On the output device, code may be output as code displayed within a user interface (UI) element, code output or displayed within a source code editor or a text editor, code written in a printed document, code written in a stored file, etc.

Programmer can refer to a technical or lay user or viewer of programming language code, e.g. a programmer, developer, product manager, tester, customer, etc.

Exemplary Embodiments

Examples of programming environments for use with exemplary embodiments include, but are not limited to, statically-typed programming environments like Java™ (in which variables have a type that is known and checked at compile-time), and dynamically-typed programming environments like the MATLAB® software from The MathWorks, Inc. (in which variables are declared without defining their types).

Exemplary embodiments may be provided in a programming environment by adding new capabilities to an existing integrated development environment (IDE) or as a stand-alone application including its own source code editor. Alternatively, exemplary embodiments may be provided in other environments or as tools integrated with other applications.

FIG. 1 illustrates a high-level block diagram of a programming environment 100 in which exemplary embodiments are provided as a part of an integrated development environment (IDE). An IDE is a software application that provides facilities to computer programmers for software development. For example, an IDE may provide a programmer with facilities for writing, debugging, compiling and executing code.

The programming environment 100 may include an IDE 102, a compiler/interpreter 120, and a repository 122. The IDE 102 may include one or more modules including, such as a source code editor 104, a debugger 106, and a source code analyzer 108. The source code editor 104 may be an editor program configured to display and edit source code. The debugger 106 may be a program configured to test and debug source code. For example, if the source code crashes during execution, the debugger 106 may show the location in the source code where the error was detected. The source code analyzer 108 may be a program configured to analyze the behavior of a program embodied by source code. For example, the analyzer 108 may perform static code analysis (analysis of code performed without actually executing the code), standard data flow analysis (information gathering about possible sets of values calculated at various points in the code), etc.

Non-literal representation module 110 may be a program, module or other software that provides non-literal representations and functionalities associated with non-literal representations described herein. The non-literal representation module 110 may include a programming unit generation module 112 which may allow the underlying source code of a non-literal representation block to be converted into a separate programming unit. Examples of a programming unit include, but are not limited to, a class, function, method, subroutine, statement, expression, etc. In an exemplary embodiment, programming unit generation module 112 may create a new programming unit that encapsulates the underlying code and may replace the underlying code with a call to the new programming unit. The call to the new programming unit may be output as a non-literal representation.

The non-literal representation module 110 may include a reuse module 114 which may allow reuse of non-literal representation blocks within source code. In the reuse process, a programmer may copy a non-literal representation block from an initial location to other locations. In an exemplary embodiment, the reuse module 114 may reproduce the underlying code from the initial location at the other locations. In addition, the reuse module 114 may apply the non-literal representation at the initial location to the reproduced code at the other locations.

The non-literal representation module 110 may include a reverse refactoring module 116 which may allow incorporation of infrequently called programming units into the bodies of other programming units. For example, a first programming unit may be called by a second programming unit. At the site in the second unit where the first unit is called, the reverse refactoring module 116 may incorporate the first programming unit into the body of the second programming unit. The reverse refactoring module 116 may represent the incorporated portion in the second unit by a non-literal representation.

The non-literal representation module 110 may include an automatic generation module 118 which may automatically generate non-literal representations for source code with minimal or no programmer input. For example, the automatic generation module 118 may automatically identify one or more portions of code to be output as non-literal representations. The automatic generation module 118 may also automatically provide the non-literal representations.

The programming environment 100 may include a compiler/interpreter 120 and a repository 122. The compiler/interpreter 120 may compile or interpret source code written in the programming environment 100. The repository 122 may store one or more source code files 124 containing source code.

In an exemplary embodiment, information on non-literal representations in source code may be saved in one or more mapping files 126, and configuration information may be saved in configuration files 128. The repository 122 may also include one or more mapping files 126, each containing information on the format and content of non-literal representations in a source code file. For example, a mapping file may associate locations in the source code file with corresponding non-literal representations. The repository 122 may further include one or more configuration files 128, each containing information on configuring the output of the non-literal representations saved in one or more mapping files 126. The repository 122 may also include links between the source code files and associated mapping files 126 and configuration files 128.

In another exemplary embodiment, information on non-literal representations in source code may be saved in one or more project databases 130 in a project setting. A project database may contain information constituting a project and information required for the execution of a project, e.g. source code for a project, compiler instructions, etc. In yet another exemplary embodiment, the information may be saved in one or more resource files 132. Exemplary embodiments may also save the information in a combination of one or more mapping files, configuration files, project databases and/or resource files.

Some exemplary embodiments may be implemented in the programming environment 100 without making any changes in the programming environment or a programming language. Alternatively, some exemplary embodiments may configure a programming language in the programming environment 100 to provide support for non-literal representations of source code. For example, exemplary embodiments may define or extend a syntax of the programming language to permit defining and naming non-literal representations of code. Exemplary embodiments may also specify one or more inputs, outputs, tags, exceptions, or other information associated in the definition of programming units in the programming language. Exemplary embodiments may further enable type, size and scope checking of non-literal representations to ensure that the non-literal representations fit into the type, size and scope rules of the programming language.

Exemplary embodiments may also configure the programming language to support functionalities described herein. Examples of these functionalities include, but are not limited to, reuse of non-literal representations of code, selective disabling of a portion of the code by using a particular tag for a non-literal representation associated with the disabled portion of the code, checking types and sizes of different non-literal representation blocks, etc.

Exemplary embodiments may further configure the programming language to integrate the semantics of the non-literal representations into the language's support for aspects and other advanced language features.

As described above, FIG. 1 illustrates an exemplary embodiment in which non-literal representation functionality is provided as part of an integrated development environment (IDE). Non-literal representation functionality may be provided in other embodiments, and is not limited to the exemplary embodiment of FIG. 1. For example, in another exemplary embodiment, the non-literal representation module 110 of FIG. 1 may be provided as a plug-in that may be a plugged into an IDE to provide non-literal representations of code in the IDE. In yet another exemplary embodiment, non-literal representation functionality may be provided as a stand-alone application that may operate independent of an IDE. This stand-alone application may include a source code editor on which code may be output in their non-literal representations.

Examples of Non-Literal Representations

Figure 2D:
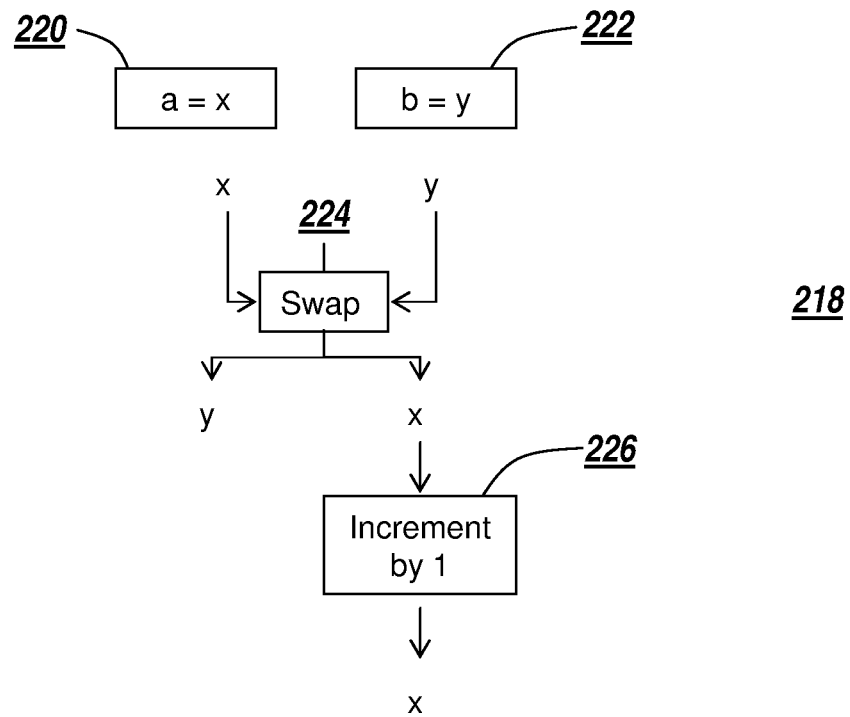
FIG. 2D illustrates an output of the source code of FIG. 2A in which the identified portions are output as symbolic descriptions of the underlying source code.

Exemplary non-literal representations of source code will now be described with reference to examples depicted in FIGS. 2A-2I. FIG. 2A illustrates source code for the definition of a function named example. Three portions of the source code 200, 202, 204 have been identified for output in their non-literal representations. The portions of the source code may be identified by a programmer or automatically by the automatic generation module 118.

Different non-literal representations may take different forms. Examples of these different forms can include, but are not limited to, a mock call to a programming unit like a function or method call, a textual description of the source code, a representation of the semantics of the source code using symbolic elements, a condensed version of the source code, and pseudocode. Non-literal representations may also include a combination of one or more of the following, e.g. a textual description of the underlying source code that also incorporates symbolic elements to describe the semantics of the source code, code that uses mathematical or engineering symbols (such as integral signs or summation signs) to describe the behavior of the source code or the aspect of an engineering model associated with the model, or an associated tags or symbols (such as "Argument Checking Code" or "Debugging Output" or associated icons) that hide the underlying code complexity to better focus the user on other aspects of the program logic.

A. Mock Calls

As mentioned above, a non-literal representation may take the form of a mock call to a fake programming unit, i.e. a call to a programming unit that does not exist in the source code. The name and/or variables associated with the fake programming unit may provide descriptive information on the underlying source code. For example, the mock call to a fake programming unit may include a name for the programming unit that is descriptive of the underlying code. The mock call may also include information on the input and/or output variables of the underlying source code.

FIG. 2B shows an example of a non-literal representation that takes the form of a mock function call. In particular, FIG. 2B illustrates output of the source code of FIG. 2A in which the identified portions of code 200, 202, 204 (FIG. 2A) are output as three mock calls to a fake function 206, 208, 210, (FIG. 2B) respectively. The mock calls indicate that the fake function is named swap_and_add and that the fake function accepts two arguments and outputs four values. The underlying source code does not include a function called swap_and_add. However, the name of this fake function more concisely describes the task performed by the underlying source code, while retaining important information on the input and output variables of the underlying source code.

B. Textual Descriptions

In another example, a non-literal representation may take the form of a textual description that describes the underlying source code in English or any other language.

FIG. 2C illustrates an output of the source code of FIG. 2A in which the identified portions of code 200, 202, 204 (FIG. 2A) are output as textual descriptions of the underlying source code 212, 214, 216, (FIG. 2C) respectively. Each description includes a descriptive name for the non-literal representation, swap_and_add, which concisely describes the task performed by the underlying source code. The descriptions may also include additional information on the underlying source code that may be of use to a programmer. This additional information may include, but is not limited to, variables used by the underlying source code and/or variables set by the underlying source code, etc.

C. Symbolic Representations

In yet another example, a non-literal representation may take the form of a symbolic representation that may describe the underlying source code with the use of various symbolic elements. Examples of these symbolic elements include, but are not limited to, different types and/or shapes of symbols, e.g., blocks, arrows, lines, characters, text, etc. Exemplary embodiments may configure the programming environment 100 to provide support for symbolic elements used to create such symbolic non-literal representations.

FIG. 2D shows an example where the non-literal representation takes the form of symbolic representations. In particular, FIG. 2D illustrates an output of the source code of FIG. 2A in which the first identified portion of code 200 (FIG. 2A) is output as a symbolic representation 218 (FIG. 2D). The other identified portions of code 202, 204 (FIG. 2A) may also be output with associated symbolic representations (not shown in FIG. 2D).

The non-literal representation of FIG. 2D may provide a first block 220 reading "a=x" and a second block 222 reading "b=y." These blocks can indicate that the underlying source code first sets the variable a to the value of x, and the variable b to the value of y. A "swap" block 224 may accept two variables x, y as inputs and output the two variables y, x. This block indicates that the values of the variables x and y are swapped. An "increment by 1" block 226 may then accept the variable x output by the "swap" block 224, and may output the variable x. This block may indicate that the value of x is incremented by one.

D. Condensed Version of Source Code

A non-literal representation may take the form of a condensed version of the source code. Examples of condensed versions include, but are not limited to, a subset of the underlying source code, a condensed description of the underlying source code in pseudocode, etc. FIG. 2E illustrates an example in which the identified portions of code 200, 202, 204 in FIG. 2A are output as non-literal representations as their condensed versions 228, 230, 232, respectively. The condensed versions in FIG. 2E depict the portions of the source code which set the output variables a, b.

E. Pseudocode

In yet another example, a non-literal representation may take the form of pseudocode. Pseudocode can be a compact high-level description of a computer programming algorithm that can use structural conventions of a programming language. Pseudocode is intended primarily for human interpretation, in contrast to source code which is in a machine-interpreted format that may be less suitable for human interpretation.

F. Information on Underlying Source Code

The non-literal representations may retain important information about the underlying source code. Examples of this information can include, but are not limited to, one or more inputs and/or outputs of the underlying source code, a name describing or denoting the non-literal representation, a tag describing the task performed by the underlying source code, etc. The information can also include additional information appropriate for the underlying source code, the underlying application or the programming language, e.g. exceptions that may be thrown by the underlying source code.

In an exemplary embodiment, information on the underlying source code may be presented within the non-literal representations. That is, the information may be output as part of the non-literal representations. In another exemplary embodiment, information on the underlying source code may be presented separately from the non-literal representations. That is, the information may not be output as part of the non-literal representations, but may be invoked independently of the non-literal representations. Ways of invoking the information include, but are not limited to, affordances such as a menu-item, a keyboard shortcut, the right mouse button, hovering of the mouse icon, etc.

G. Descriptive Tags

FIG. 2F illustrates an output of the source code of FIG. 2A in which the identified portions of code 200, 202, 204 (FIG. 2A) are output as non-literal representations 234, 236, 238, (FIG. 2F) respectively. Each of the non-literal representations 234, 236, 238 provides a tag "variable setting code" which describes the variable-setting task performed by the underlying source code. The tag is provided as part of non-literal representations 234 and 236, where the tag is output within the non-literal representations. The tag can be provided separately from the non-literal representation 238. The tag may be invoked via representation 238, by, for example, selecting the tag using a pointing device. In the example depicted in FIG. 2F, this tag can be output, e.g. in a tooltip 240, when the programmer hovers the mouse icon over the representation 238.

H. Visually Distinguishing Non-Literal Representations

In order to visually distinguish the non-literal representation portions from the source code portions, the non-literal representations and the source code may be output in different visual formats, e.g. using different fonts, font sizes, font colors, font styles, etc. For example, in an output, the source code portions may be output in a non-italicized font style, while the non-literal representation portions may be output in italics. FIG. 2G illustrates an output of the source code of FIG. 2A in which the identified portions of code 200, 202, 204 (FIG. 2A) are output as italicized non-literal representations 242, 244, 246 (FIG. 2G).

These visual formats may also be varied based on the tags of and/or the types of tasks performed by the non-literal representations. In an exemplary embodiment, non-literal representations having a certain tag may be output in a different visual format than the surrounding source code and other non-literal representations not having the tag. For example, non-literal representations of debugging code (i.e. code that performs debugging tasks) may be output in italics.

In other exemplary embodiments, the non-literal representations and the source code portions may be output in the same visual format.

I. Toggling

In the output of each non-literal representation, exemplary embodiments may provide a toggle option to switch between the output of the non-literal representation and the underlying source code. That is, when the output shows a non-literal representation, the toggle option may change the output to the underlying source code. Similarly, when the output shows the underlying source code, the toggle option may change the output to the non-literal representation of the source code.

This toggle option may be presented to the programmer in different ways including, but not limited to, as a dedicated icon near each non-literal representation, upon hovering the mouse over a representation, upon clicking the right mouse button over the representation, upon entering a keyboard shortcut, etc. In an exemplary embodiment, there may be a master toggle option for the entire source code file, which switches between the output of all the non-literal representations and all the source code in the file.

FIG. 2H illustrates an output of the source code of FIG. 2A in which the identified portions of code 200, 202, 204 (FIG. 2A) are output as non-literal representations. In this example, the toggle option is provided as dedicated icons 248, 250, 252 (FIG. 2H) that appear adjacent to the portions of code 200, 202, 204, respectively. In this example, the toggle options have been used such that the output shows the non-literal representations 254 and 256 for the portions of code 200 and 204, respectively, and shows the actual underlying source code for the portion of code 202.

In addition, while a portion of the code is being output in its non-literal representation, the programmer may simultaneously view the underlying source code. The underlying source code may be output in different ways including, but not limited to, as a separate block of text in the output, in a tooltip, etc. The programmer may invoke this output or display of the source code in different ways including, but not limited to, hovering the mouse icon over the portion, clicking the right mouse button over the portion, clicking a dedicated icon near the portion, entering a keyboard shortcut, etc. FIG. 2I illustrates an output of the source code of FIG. 2A in which the underlying source code for a non-literal representation 258 is output simultaneously in a separate portion 260 of the output. In this example, this simultaneous output may be invoked by the programmer by highlighting the non-literal representation 258.

Overview of Process

Figure 3:
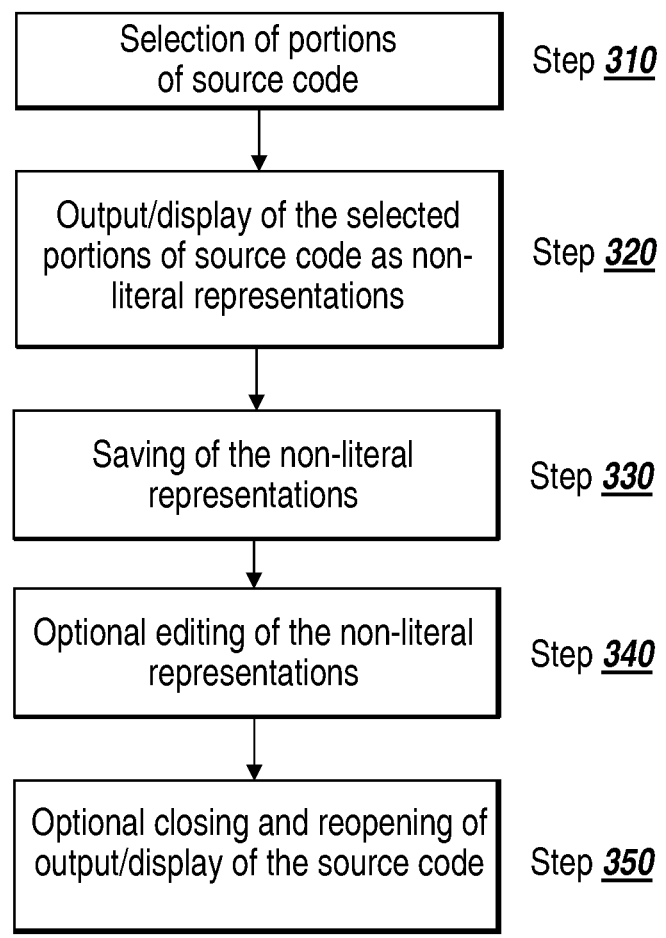
FIG. 3 illustrates a flow diagram showing processing acts that may be performed to output non-literal representations of source code.

FIG. 3 is a flow diagram that illustrates processing acts that can be performed in exemplary embodiments to provide non-literal representations of source code. These acts may be performed by the non-literal representation module 110 illustrated in FIG. 1.

In step 310, one or more portions of the source code may be identified for output as non-literal representations.

In step 320, the source code may be output such that the identified portions of the source code are output as non-literal representations.

Exemplary embodiments allow saving of not only the source code in the source code file but also of the non-literal representations associated with the source code. In step 330, the non-literal representations may be saved in a storage device.

In step 340, one or more of the non-literal representations may be edited and/or deleted. That is, after providing a non-literal representation for a portion of source code, the programmer may modify the non-literal representation. The programmer may also delete the non-literal representation such that the portion of the code is always output as the source code.

In step 350, the programmer may close and subsequently reopen the output of the source code. When the output is reopened, a portion of the source code with an associated non-literal representation may be output either in its source code form or in its non-literal representation. Exemplary embodiments may provide different options for viewing portions of the source code that have associated non-literal representations.

For a single source code file, the source code may be output in multiple versions, each version outputting a different set of non-literal representations. For example, the same source code file may be presented in one version with symbolic non-literal representations, and in another version with descriptive non-literal representations. Steps 310-340 of FIG. 3 may be performed multiple times to create multiple versions of non-literal representations for a single source code file.

In addition, non-literal representations may be created and provided recursively. That is, a portion of source code for which a non-literal representation is provided may itself have portions that in turn are represented with additional nested non-literal representations.

Any user-initiated operations illustrated in FIG. 3 may be performed automatically in alternative embodiments.

Identification of Portions of Source Code

Figure 4:
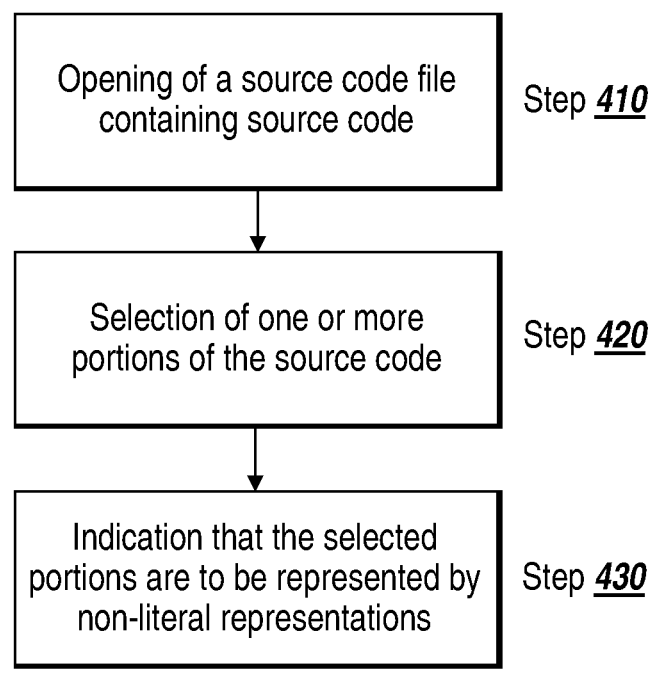
FIG. 4 illustrates a flow diagram showing processing acts that can be performed to identify one or more portions of source code for output in their non-literal representations.

FIG. 4 illustrates a flow diagram showing steps performed in exemplary embodiments to identify one or more portions of source code for output as non-literal representations. In step 410, a source code file may be opened in an output means in the programming environment, e.g. in a user interface (UI) element, a source code editor, a text editor, a printing means that outputs the source code on the screen or prints the source code on paper, etc.

A. Manual Identification

In step 420, one or more portions of the source code may be manually identified by the user for output as non-literal representations. The user may identify one or more arbitrarily-selected portions of the source code for output as non-literal representations. For example, a single unbroken portion of the source code may be identified, or multiple non-contiguous portions of the source code may be identified simultaneously.

In some exemplary embodiments, one or more portions of source code may be identified by the programmer in step 420. The programmer may use different methods to identify the portions of the source code. Examples of these methods include, but are not limited to, selecting the portions of source code with a mouse or keyboard, inserting special features, comments or special markers that identify the identified portions, inserting symbols or text at the beginning and end of each identified portion, etc.

B. Automatic Identification

In other exemplary embodiments, one or more portions of source code may be identified automatically by the automatic generation module 118 in step 420, e.g. based on one or more predefined criteria. The automatic generation module 118 may also determine a mapping between each identified portion and the format and/or content of non-literal representations representing the identified portion. For example, for portions of code within loops, the automatic generation module 114, 130 may automatically specify that the non-literal representation is to be symbolic. In addition, the automatic generation module 114, 130 may also automatically provide additional information, e.g. tags, variables used or set by the underlying source code, etc. This information may be obtained in part by parsing and analyzing the source code.

After identifying the portions of source code, the automatic generation module 118 may ask the programmer for confirmation that the identified portions of code are appropriate for output as non-literal representation. Although portions of the source code may be identified automatically, this automatic identification may be overridden or augmented by the programmer.

Some programming environments may use macros to enable or disable certain types of code, e.g. debugging code, type checking code. The automatic generation module 118 may parse the source code, and mark code blocks enclosed in macros as identified portions that will be used for non-literal representation. The automatic generation module 118 may determine a mapping between a type of macro and the format and/or content of non-literal representations associated with the macro blocks. For example, debugging code, as identified by macros, may be associated with a non-literal representation that merely states "debugging code." In addition, the automatic generation module 118 may tag the code portions to identify the type of the code, e.g. "debugging code," "type checking code."

The automatic generation module 118 may use code parsing and analysis techniques to automatically identify portions of source code for representation with non-literal representations. In an exemplary embodiment, the automatic generation module 118 may use indentations, special features or markers in the code, or code syntax in the source code to automatically identify certain programming units which may be identified in step 420, e.g. classes, methods, functions, code blocks enclosed in loops and conditional statements, etc. For example, exemplary embodiments may recognize a special feature (e.g. a special comment or attribute that applies to a block of code) and automatically identify a portion of code associated with the special feature based on the scope of application of the feature. In addition, the special feature itself may be automatically set as part or all of the non-literal representation.

1. Programming Units

The programming environment may generate a hierarchical list or some other structure to represent the programming units contained in the source code. The automatic generation module 118 may identify one or more of the programming units for output as non-literal representations. The identification may be based on a predefined specification of programming unit types that are to be automatically identified. After identifying each portion of the source code, the automatic generation module 118 may require the programmer to confirm that an appropriate code portion is identified, e.g. using a user interface which displays the automatically identified portion.

FIG. 5 illustrates a list 500 of the programming units in the source code of FIG. 2A. The list includes three if blocks 502, 504, 506. If a predefined specification directs identification of if blocks in the source code, then the automatic generation module 118 may identify the underlying source code for the if blocks 502, 504, 506 for output as non-literal representations.

2. Programs and Special Comments

In addition, the programmer may identify blocks of code for representation in non-literal form using information in pragmas or special comments in the source code, information in project databases or information in resource files associated with the source code, or information obtained by parsing language features designed to support non-literal representations. Pragmas are compiler directives which communicate implementation-specific information. Exemplary embodiments may specify certain pragmas/comments to use in the identification step. The automatic generation module 118 may parse the source code and automatically identify the specified pragmas/comments. The automatic generation module 118 may then identify one or more of the portions of code associated with the pragmas/comments for output as non-literal representations.

FIG. 6A illustrates source code including a pragma 600 of the format %# function <function_name_list> which informs the compiler that the listed functions should be included in the compilation, whether or not the compiler dependency analysis detects the functions. If exemplary embodiments specify that pragmas of this format are to be identified, the automatic generation module 118 may automatically identify the pragma 600 for output as non-literal representation. FIG. 6B illustrates an output of the source code of FIG. 6A in which the identified pragma 600 is output as its non-literal representation 602. In this example, the non-literal representation 602 is textual and describes the task performed by the underlying pragma 600.

3. Usage of Code

The automatic generation module 118 may further identify portions of code for representation in non-literal form by analyzing the usage of the code, underlying programming units and/or existing non-literal representations. For example, if an analysis of the code shows that debugging code is rarely used, the automatic generation module 118 may reduce visual clutter by outputting all debugging code in its non-literal representation. Debugging code may be identified by parsing the code to analyze the function names, comments or tags attached to identify debugging code. In addition, the automatic generation module 118 may generate variants of existing non-literal representations based on the usage of the code, underlying programming units and/or existing non-literal representations.

In step 430, after identification of the portions of the source code, an indication may be provided that the identified portions are to be output in their non-literal representations. In an IDE, exemplary embodiments may modify an IDE-specific command to invoke this functionality. Nonetheless, in an IDE or in a standalone application provided by exemplary embodiments, the programmer may invoke non-literal representation outputs using different options. Examples of these options include, but are not limited to, a button/icon or any other affordance in the source code output, a menu-item in a menu, a keyboard shortcut, a menu-item in a right-mouse-click menu, etc.

Output of Non-Literal Representations

After identifying portions of source code, the identified portions are output in their non-literal representations. This technique does not alter aspects of the underlying source code, e.g. the content or format, and merely changes the output of the code in the source code editor. One or more of the non-literal representations may be specified by the user or selected automatically. This step will now be described in more detail in connection with FIG. 7.

Figure 7:
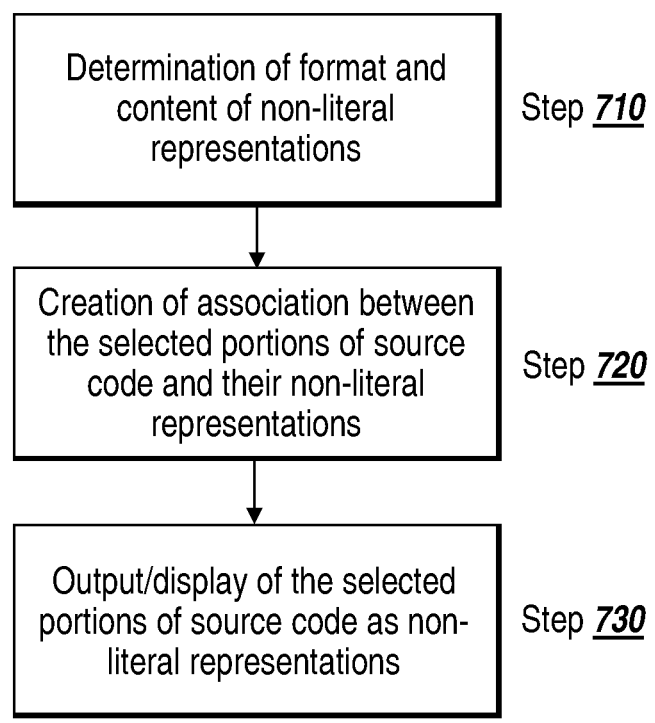
FIG. 7 illustrates a flow diagram showing processing acts that can be performed to provide non-literal representations of source code.

FIG. 7 is a flow diagram showing steps performed in exemplary embodiments to provide non-literal representations of source code. In step 710, exemplary embodiments determine the format and content of each non-literal representation. In step 720, exemplary embodiments may create an association between identified portions of the source code and their non-literal representations. In step 730, exemplary embodiments may output the source code portions in their non-literal representations using the associations created in step 720.

In step 710, exemplary embodiments determine the format and content of each non-literal representation. In an exemplary embodiment, in the same source code file, different code portions may be associated with different non-literal representation formats and/or contents. In another exemplary embodiment, in the same source code file, different code portions may be associated with the same non-literal representation format, e.g. all may be textual descriptions.

In an exemplary embodiment, the format and content of a non-literal representation may be determined automatically by the automatic generation module 118 with little or no input from the programmer. Exemplary embodiments may automatically provide a default format, e.g. a textual description, a symbolic diagram, etc.

Exemplary embodiments may also automatically provide content for the non-literal representations. In an exemplary embodiment, the automatic generation module 118 may parse the comments associated with the identified code portion, and set a portion of the comments as the non-literal representation content for the code portion. In another exemplary embodiment, the source code editor may parse the control statements in the identified source code portion, and set portions of the control statements and associated variables as non-literal representation content for the source code portion.

Exemplary embodiments may further determine the format and content of non-literal representations by analyzing the usage of the code and/or existing non-literal representations. For example, if an analysis of the code shows that the majority of the existing non-literal representations are symbolic representations, exemplary embodiments may determine that a new non-literal representation may be provided in a symbolic format.

In another exemplary embodiment, the format and content of a non-literal representation may be specified by the programmer. Exemplary embodiments may present one or more user interfaces to enable the programmer to specify the format and content of non-literal representations. A user interface may provide a default format and a listing of all format options available for identification. The user interface may also provide a sample display for each format option to show an exemplary non-literal representation based on the format.

A. User Interfaces for Configuring Content of Non-Literal Representations

Exemplary embodiments may also provide one or more user interfaces to enable the programmer to configure the content of non-literal representations. One or more user interface may also allow the programmer to enter, edit and configure this non-literal representation.

In a first example, the format of a non-literal representation may be a condensed version of the underlying source code. This condensed version may be actual source code or pseudo-code. In this example, the user interface may present a text-box in which the programmer may enter the condensed version of the source code portion. The user interface may initially present the entire source code portion in the text-box, which the programmer may edit and condense.

Figure 8A:
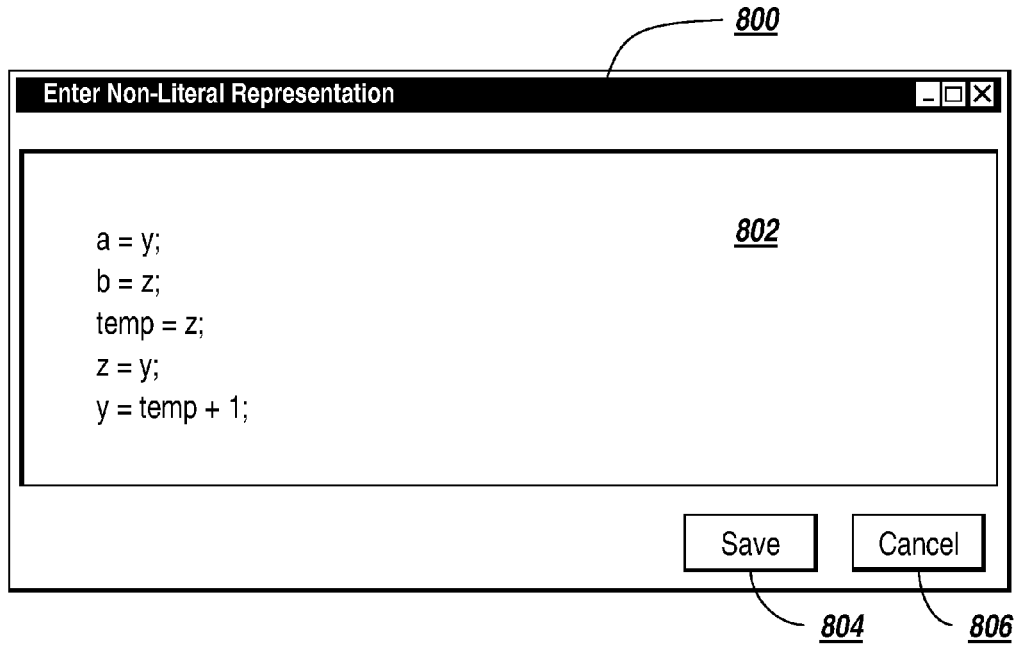
FIGS. 8A and 8B illustrate exemplary user interfaces for specifying non-literal representations.

FIG. 8A illustrates an exemplary user interface 800 provided by exemplary embodiments to allow a programmer to specify non-literal representations. The user interface 800 may be displayed on a display device. The user interface 800 may include a text-box 802 in which the programmer may enter one or more non-literal representations. In this example, the text-box 802 initially contains an identified portion of code, which the programmer may then edit and condense. The user interface 800 may also include a save option 804 which, when invoked, saves the non-literal representations entered in the text-box 802. The user interface 800 may also include a cancel option 806 which, when invoked, cancels the entry of non-literal representations.

In a second example, the format of a non-literal representation may be a textual description of the underlying source code. In this example, the user interface may present a text-box in which the programmer may enter the textual description. The user interface 800 illustrated in FIG. 8A may also be used in this example.

In a third example, the format of a non-literal representation may be a mock call to a fake programming unit. In this example, the user interface may present a text-box in which the programmer may enter the mock call. The user interface 800 illustrated in FIG. 8A may also be used in this example.

In a fourth example, the format of a non-literal representation may be a symbolic representation of the underlying source code. That is, the non-literal representation for a source code portion may be an arrangement of symbols and/or blocks representing the semantics and organization of the source code portion. In this example, the user interface may present visual elements for such a symbolic representation, e.g. elements for variables and constants, mathematical and logical operators, control logic and flow, etc, and lines connecting two or more elements. The user interface may also present a blank text area or canvas with drawing functionalities on which the programmer may organize the elements and lines to create the symbolic representation.

Figure 8B:
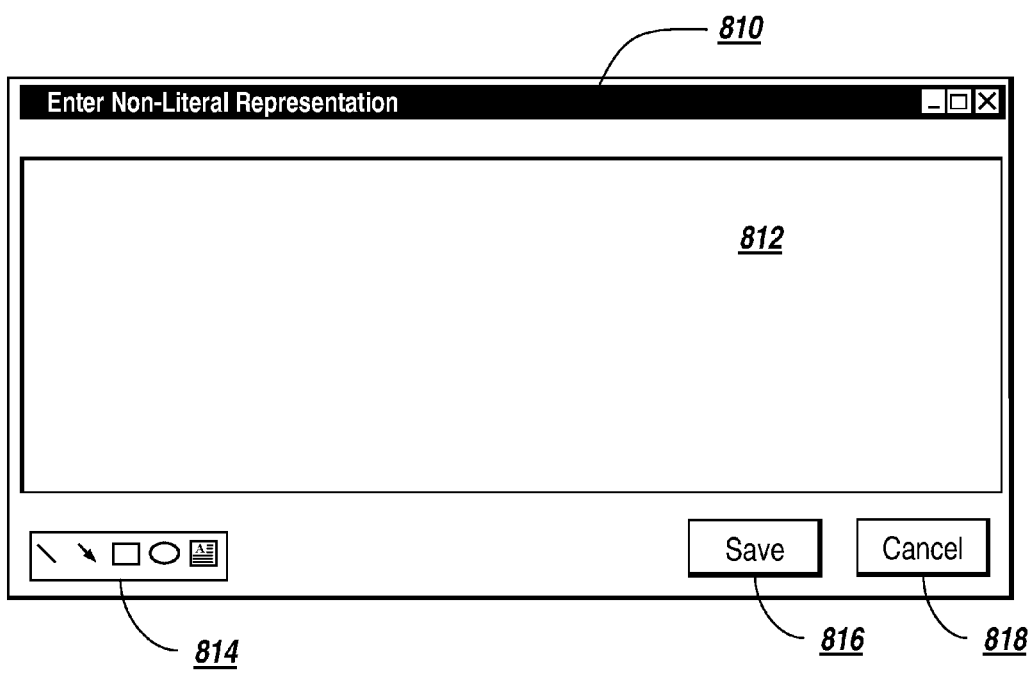

FIG. 8B illustrates an exemplary user interface 810 that allows a programmer to specify non-literal representations. The user interface 810 may include a blank canvas 812 in which the programmer may enter one or more non-literal representations. The user interface 810 may include options 814 for drawing one or more symbolic elements on the canvas 812, e.g. lines, arrows, rectangles, circles, text. The user interface 810 may also include a save option 816 which, when invoked, saves the non-literal representations entered on the canvas 812. The user interface 810 may also include a cancel option 818 which, when invoked, cancels the entry of non-literal representations.

Exemplary embodiments may also provide high-level information about the underlying source code to improve a programmer's understanding of the non-literal representations. Examples of high-level information include, but are not limited to, the input/output variables of the portion of source code, the data types of the input/output variables, a descriptive name for the portion of source code, a tag describing the kind of task performed by the portion of source code, and any additional information appropriate to the application or the programming language, etc.

In an exemplary embodiment, a user interface may allow the programmer to enter, edit and configure high-level information. In another exemplary embodiment, certain high-level information may be queried from the IDE and inserted automatically. For example, the input/output variables for a source code portion may be queried from the IDE which uses compiler flow analysis methods. Nonetheless, automatically provided information may also be edited by the programmer using a user interface.

In an exemplary embodiment, information may be incorporated into the non-literal representations. In another exemplary embodiment, information may be provided separately from the non-literal representations with the use of an affordance.

Exemplary embodiments may create an association between identified portions of the source code and their non-literal representations. Association information may identify source code portions that are to be output in their non-literal representations. The association information may also include the format, content and/or associated information of the non-literal representations for each identified source code portion.

An output means, e.g. a source code editor, may use this association information to output the source code. A output means may open up and parse both the source code file and the association information. For each location identified in the association information, the editor may parse the source code to identify the associated location of the non-literal representation. The editor may then output the source code at that location with the non-literal representation contained in the association information.

Mapping Files

In an exemplary embodiment, information associating source code to associated non-literal representations may take the form of a mapping file 126 (FIG. 1). In an exemplary embodiment, a mapping file may map the beginning and ending locations, e.g. line numbers, of each non-literal representation location. FIG. 9 illustrates an exemplary mapping file for the source code of FIG. 2A. The mapping file may include locations 900, 902, 904 of source code portions along with the contents 906, 908, 910, respectively, of their non-literal representations.

In another exemplary embodiment, a mapping file 126 (FIG. 1) may map identifiers of chunks of source code to associated non-literal representations. These identifiers may include class names, function names, method names, positions of the chucks of code in a hierarchical list of elements in the source code, etc.

In a further exemplary embodiment, this association may take the form of information saved in a project database 130 (FIG. 1). In yet another exemplary embodiment, this association may take the form of information saved in a resource file 132 (FIG. 1). In another exemplary embodiment, the association information may be saved in a combination of one or more mapping files, project databases and resource files.

Exemplary embodiments may allow a programmer to create, edit or delete a mapping file, a project database and a resource file, e.g. by providing a user interface.

Exemplary embodiments may output the source code portions in their non-literal representations using the associations created in step 720 (FIG. 7). The remaining portions of the source code may be output in their source code form.

The non-literal representations may be made persistent by saving the files containing the association information in a storage device. For example, for a source code file, exemplary embodiments may save associated mapping files, project databases, resource files, etc.

Additional information on the underlying source code, e.g. tags, may also be made persistent by saving the information in a storage device. When the information is incorporated as part of the non-literal representations, the information may be saved in the mapping file containing the non-literal representations. When the information is provided separately from the non-literal representations, the information may be saved in a separate file from the mapping file. This separate file may be associated with the source code file, and may be consulted when reopening the source code file in the output means.

A programmer may further edit or delete the non-literal representations, e.g. using one or more user interfaces or by directly editing the mapping files 126, project databases 130, and resource files 132 (FIG. 1).

The programmer may edit the format, content and/or location of a non-literal representation. As one example of an edit, the programmer may promote a non-literal representation to an actual programming unit, e.g. a new class, method, function, subroutine, etc. That is, the underlying source code of the non-literal representation at the original location is refactored into a new programming unit, and the source code at the original location is converted into a call to the new programming unit. The programmer may also delete a non-literal representation, which does not alter the underlying code and merely reverts back to the full output of the underlying source code.

A programmer may close the source code file in the output means, and may later reopen the source code file. If the source code file has more than one associated set of non-literal representations, the programmer may specify which set to output when opening the source code file.

The output means may consult the source code file and the mapping document to determine which portions of source code to represent in non-literal form. The output means may open up and parse both the source code file and the mapping document. For each beginning-ending location pair in the mapping document, the output means may parse the source code to identify associated source code portions. Upon identifying the source code portion, the editor may represent the portion with the non-literal representation associated with the beginning-ending location pair contained in the mapping document.

In an exemplary embodiment, when the source code file is reopened, the output means may have a default "non-literal representation" or "underlying source code" mode for presenting the source code. Each programmer may customize or override the default mode, such that the output means has a programmer-specific default mode for each programmer. For example, the output means may present all source code files in a "non-literal representation" mode for programmer A and in an "underlying source code" mode for programmer B.

In addition, the output means may have a file-specific default mode for each source code file. For example, the output means may present source code file code_file_1 in a "non-literal representation" mode and code_file_2 in an "underlying source code" mode.

Configuration Files

A configuration file 128 (FIG. 1) may be associated with a source code file and a mapping file. The configuration file may specify whether and how the non-literal representations contained in the mapping file should be output when the source code file is opened in the output means. That is, the configuration file may specify that either the non-literal representations should be output, or that the source code should be output in their source code form. For example, a configuration file may specify that non-literal representations should be output when a first file source_code_file1 is presented in an output means. Similarly, a configuration file may specify that non-literal representations should not be output, i.e. the source code should be output in their entire, original form, when a second file source_code_file2 is presented in an output means. Nonetheless, after the source code file is opened in the output means, a programmer may then collapse portions of the source code to output associated non-literal representations, or expand non-literal representations to output the underlying source code.

A configuration file may also be associated with a programmer, and may specify whether the non-literal representations should be output when the source code file is opened in the output means by a particular programmer. For example, a configuration file may specify that non-literal representations should be output when a file is presented in an output means by a first programmer d1. Similarly, a configuration file may specify that non-literal representations should not be output, i.e. the source code should be output in their entire, original form, when the file is presented in an output means by a second programmer d2. Nonetheless, after the source code file is presented in an output means in the output means, the programmer may then collapse portions of the source code to output associated non-literal representations, or expand non-literal representations to output the underlying source code.

A configuration file may be used to implement securities in output source code. For example, for a secured source code file, programmer d1 may be given full security access to view the entire underlying source code, but programmer d2 may be given limited security access only to view certain portions of the source code. That is, programmer d2 may only be allowed to view a first portion of the source code, and may be disallowed from viewing a second portion of the source. When programmer d2 opens the source code file, the source code editor may output the original source code for the first portion, but may lock the output of the second portion to only the non-literal representations of the second portion. That is, the source code editor may not output the underlying source code for the second portion to programmer d2. Similarly, for another programmer d3 who has no security access to the entire code, the source code editor may lock the output of the code to only non-literal representations of the entire code.

To this end, a configuration file may be associated with a programmer, and may restrict certain outputs of the source code for particular programmers. That is, the configuration file may specify whether a particular programmer has security access to view underlying source code for each of the non-literal representation portions output in the output means.

FIG. 10 illustrates an exemplary configuration file for the source code of FIG. 2A. The configuration file may include identifiers for two programmers 1000, 1002 who have access to the source code file of FIG. 2A, and may indicate the security levels of the programmers: programmer 1000 is authorized 1004 to fully view the underlying source code, while programmer 1002 is not authorized 1006 to view any portion of the underlying source code.

Exemplary embodiments may allow a programmer to create, edit or delete a configuration file, e.g. by providing a user interface.

Information contained in the configuration file may be provided in other ways including, but not limited to, in mapping files, project databases and resource files associated with the source code file.

The tags provided in or associated with the non-literal representations may also be used to provide some aspect-like features, even in programming environments that do not have support for aspects. The programmer may specify that portions of code associated with certain tags not be compiled or executed. The programmer may make this specification, for example, in a project's bill of materials in a project setting. Accordingly, during compilation or execution of the code, exemplary embodiments may suppress or delete portions of code associated with those tags.

For example, exemplary embodiments may provide non-literal representations of debugging code with tags that indicate that the underlying code is debugging code. Debugging code may be code that performs debugging tasks. When compiling or running a program, the programmer may specify that debugging code not be compiled or executed. Using the non-literal representation tags provided by exemplary embodiments and the programmer's compilation/execution preferences, different levels of debugging support may thus be provided and turned on/off at will.

Similarly, a programmer may specify that portions of code associated with certain tags not be output at all in the output means. The programmer may make this specification in, for example, a project's bill of materials in a project setting. Accordingly, during output of the source code in the output means, exemplary embodiments may suppress or delete portions of code associated those tags.

Debugging Code

FIGS. 11A-11C illustrate an example in which debugging code is output as a non-literal representation. FIG. 11A illustrates debugging source code with two identified portions 1100, 1102 identified for representation in non-literal form. FIG. 11B illustrates an output of the debugging source code of FIG. 11A in which the identified portions are output using their non-literal representations. In this example, the first debugging portion 1100 is represented using a single descriptive line "debug_in" 1104, and the second debugging portion 1102 is represented using a single descriptive line "debug_out" 1106. This non-literal representation reduces clutter and improves readability of the source code, since the programmer likely does not need to view the underlying debugging code while working on the other portions of the code.

Exemplary embodiments may have an additional advantage in the context of debugging. When a programmer debugging a program encounters a function call and enters that function in the debugger, the values of the arguments of the function change their names when they are examined in the called function, because the debugger outputs the names defined in the called function. After debugging several the functions, the programmer may have difficulty relating the name of a function argument to the name that value had in the original program. Similar issues may arise with other programming units. Exemplary embodiments avoid these issues by defining the same structure in the non-literal representations such that the names of the values are the names the values had in the original code, which reduces confusion.

The non-literal representations, "debug_in" and "debug_out" may tag the debugging code portions to identify that the portions perform debugging functionality. Based on this identification, exemplary embodiments may suppress or delete the entire debugging code portions from the output of the code in the source code editor. FIG. 11C illustrates an output of the debugging source code of FIG. 11A in which the identified portions of debugging code 1100, 1102 are suppressed or deleted from the output.

In addition, exemplary embodiments may suppress or delete the entire debugging code portions from the code when the code is compiled or executed. This reduces the time and cost of compilation and execution in circumstances where the debugging functionality is not necessary, e.g. for routine testing of the code with a range of different variable values.

Refactoring

Exemplary embodiments may allow conversion of a non-literal representation into a new programming in a process similar to refactoring. Examples of programming units include, but are not limited to, classes, methods, functions, subroutines, etc. This refactoring functionality leads to improved code readability.

The technique will now be described with reference to FIGS. 12A-12C. As illustrated in FIG. 12A, a first function foo may include a portion of code within its body that may be better encapsulated in a new programming unit. Exemplary embodiments may create a new function called bar including this portion of foo, and may include a function call to the new function bar within foo. FIG. 12B illustrates the underlying the new function bar and the modified function foo with a function call to bar. Exemplary embodiments may also output the function call to bar within foo in its non-literal representation. FIG. 12C illustrates an exemplary non-literal representation of this portion for the same underlying source code illustrated in FIG. 12B. The portion of foo including the function call to bar may be output as a mock function call to a fake function swap_and_add.

Reverse Refactoring

Exemplary embodiments may allow existing programming units that are infrequently used to be "reverse refactored" into non-literal representations. Examples of programming units include, but are not limited to, classes, methods, functions, subroutines, etc. This reverse refactoring functionality leads to higher efficiency at the point of use and reduces clutter created by infrequently used programming units.

The technique of reverse refactoring will now be described with reference to FIGS. 13A-13C. As illustrated in FIG. 13A, a first function foo may call a second function bar within its body. The second function bar may be infrequently used in the source code, e.g. bar may only be called by foo. FIG. 13B illustrates the underlying source code created by reverse refactoring of the second function bar. The body of bar is incorporated in the body of foo, and bar is subsequently deleted. Thus, the resulting source code only includes foo. After reverse refactoring, exemplary embodiments may also output the reverse refactored portion of bar that is now part of foo in its non-literal representation. FIG. 13C illustrates an exemplary non-literal representation of this portion for the same underlying source code illustrated in FIG. 13B. The portion of foo that was incorporated from bar may be output as a mock function call to a fake function swap_and_add.

Reuse of Non-Literal Representations

Exemplary embodiments may enable a programmer to reuse a non-literal representation from a first location in the source code to one or more other locations. The programmer may invoke this reuse functionality on a non-literal representation using different options. Examples of these options include, but are not limited to, affordances like a button/icon in the source code editor, a menu-item in a menu, a keyboard shortcut, a menu-item in a right-mouse-click menu, etc.

A. Promotion of Non-Literal Representation to Programming Unit

In an exemplary embodiment of this reuse functionality, the non-literal representation may be promoted to an actual programming unit, e.g. a new class, method, function, subroutine, etc. That is, the underlying source code of the non-literal representation at the original location may be refactored into a new programming unit, and the source code at the original location may be converted into a call to the new programming unit. This reuse functionality will now be described with reference to FIGS. 14A-14G.

Figure 14C:
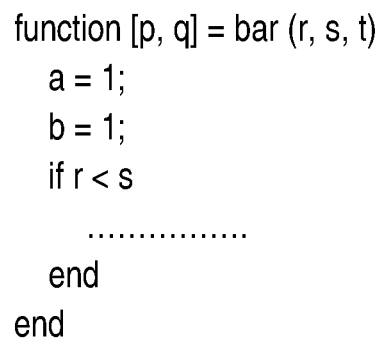

FIG. 14A illustrates an output of source code in which the identified portion of code in a first function foo is identified for output in a non-literal representation. FIG. 14B illustrates an output of FIG. 14A in which the identified portion of code is output as a mock function call. FIG. 14C illustrates a output of source code in which a second function bar reuses the non-literal representation of FIG. 14B at the dotted location. In the reuse process, the code at the original location may be promoted to a new programming unit, illustrated in FIG. 14D as a new function called new_function.

When the non-literal representation at the original location is reused at a new location, a call to the new programming unit may be added to the source code at the new location. Thus, the underlying source code is changed at both the original location and the new location to include calls to the new programming unit. As illustrated in FIG. 14E, source code at both the original and new locations may be changed to include a call to the new function new_function.

In addition, the output of the source code in the source code editor may be modified so that the original location and new location both output the non-literal representation of the new programming unit. In an exemplary embodiment, this non-literal representation is the same as the non-literal representation of the original source code identified for reuse. FIG. 14G illustrates a output of the code of FIG. 14E where the reused portions of code in functions foo and bar are output as the non-literal representation of mock function calls.

In the aforementioned process of reusing non-literal representations, exemplary embodiments may allow the programmer to guide the process of creating the new programming unit, matching variable names, creating calls to the new programming unit, and configuring the non-literal representation of the calls to the new programming unit.

B. Duplication of Underlying Code at New Location

In another exemplary embodiment of the reuse functionality, in reusing the non-literal representation from an original location to a new location, the underlying source code at the original location may be duplicated at the new location, and the two blocks of source code may be linked together. This technique does not instantiate any new programming units for the non-literal representation. Using the same example illustrated in FIGS. 14A-14C, FIG. 14F illustrates duplication of the portion of code from the function foo into the function bar. After code duplication, the two blocks of source code may remain expanded at their points of use or may be represented in their non-literal representations. FIG. 14F illustrates an output of the source code for the first function foo and the second function bar, after bar is modified to incorporate the highlighted portion of foo.

In the aforementioned process of duplicating code, exemplary embodiments may allow the programmer to guide the process of duplicating the code, matching variable names, and configuring the non-literal representation of the code.

Upon duplication of a portion of code and its associated non-literal representation from an original location to one or more new locations, the programmer may attempt to edit one of the non-literal representations. The programmer may choose to apply the edit only to the current non-literal representation, or to all linked non-literal representations.

If the portions of code at the different locations are linked together, exemplary embodiments may provide a warning that other instances of the non-literal representation exist at other locations. If the portions of code are linked together, then edits to one portion are automatically reflected in all linked portions. At this point, as a first option, the programmer may decide to keep the link intact and not edit the linked non-literal representations. As a second option, the programmer may sever the link and edit only the current non-literal representation. As a third option, the programmer may create an actual refactored programming unit from the current non-literal representation, and edit that programming unit.

Exemplary Computing Device

The programming environment 100 (FIG. 1) may be provided on a single computing device, as described below with reference to FIG. 15, on multiple computing devices (e.g. in a distributed configuration, a computing cloud, etc.), and/or in other configurations (e.g. a multi-core implementation operating on one or more platforms).

Figure 15:
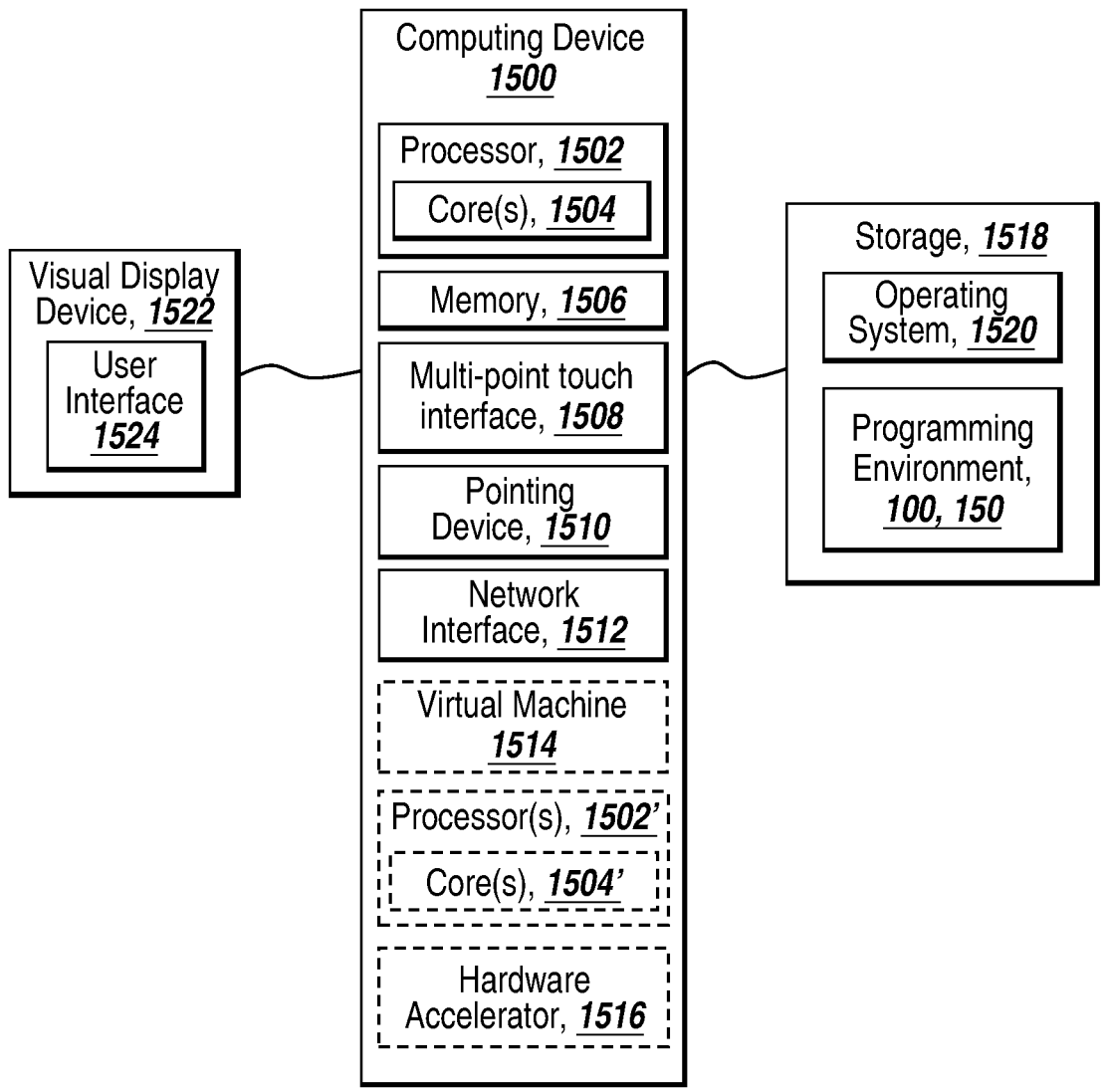
FIG. 15 illustrates an exemplary computing device that may be configured to practice exemplary embodiments.

FIG. 15 is an exemplary computing device 1500 that may be configured to practice exemplary embodiments. The implementation of FIG. 15 is illustrative and may take other forms. For example, an alternative implementation of the computing device 1500 may have fewer components, more components, or components that are in a configuration that differs from the configuration of FIG. 15. The components of FIG. 15 and/or other figures described herein may be implemented in hardware-based logic, software-based logic and/or a combination of hardware and software-based logic (e.g. hybrid logic). The components of FIG. 15 and/or other figures are not limited to a specific type of logic.

The computing device 1500 may take many forms, including but not limited to, a computer, workstation, server, network computer, quantum computer, optical computer, bio computer, Internet appliance, mobile device, a pager, a tablet computer, a smart sensor, application specific processing device, etc.

The computing device 1500 may include one or more computer-readable storage media for storing one or more computer-executable instructions or software for implementing exemplary embodiments. For example, memory 1506 included in the computing device 1500 may store computer-executable instructions or software, e.g. instructions for implementing and processing the modules in the programming environment 100. The one or more computer-readable media may also be provided separately from the computing device 1500.

The computing device 1500 may include a processor 1502 and one or more processor(s) 1502' for processing and executing software stored in the memory 1506 and other programs for controlling system hardware. Processor 1502 and processor(s) 1502' each may be a single core processor or multiple core (1504 and 1504') processor, and may include a central processing unit (CPU).

Virtualization may be employed in the computing device 1500 so that infrastructure and resources in the computing device can be shared dynamically. Virtualized processors may also be used with an application or software in storage 1518. A virtual machine 1514 may be provided to handle a process running on multiple processors so that the process appears to be using only one computing resource rather than multiple resources. Multiple virtual machines may also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code and/or software. A hardware accelerator 1516, such as implemented in an ASIC, FPGA, or the like, may additionally be used to speed up the general processing rate of the computing device 1500.

The memory 1506 may comprise a computer system memory or random access memory, such as dynamic random access memory (DRAM), static random access memory (SRAM), extended data output random access memory (EDO RAM), etc. The memory 1506 may comprise other types of memory as well, or combinations thereof.

A programmer may interact with the computing device 1500 through an output means like a display device 1522, such as a computer monitor, which may display any outputs, displays, files, user interfaces, etc, provided in exemplary embodiments. The visual display device 1522 may also display other aspects or elements of exemplary embodiments, e.g. databases, code analysis results, etc. The computing device 1500 may include other input/output (I/O) devices, such a keyboard or a multi-point touch interface 1508 and a pointing device 1510, for example a mouse, for receiving input from a programmer. The multi-point touch interface 1508 and the pointing device 1510 may be connected to the visual display device 1522. The computing device 1500 may include other suitable I/O peripherals.

The computing device 1500 may further comprise a storage device 1518, such as a hard-drive, CD-ROM, or other computer readable media, for storing an operating system 1520 and other related software, and for storing the programming environment 100, such as the MATLAB programming environment.

The computing device 1500 may include a network interface 1512 to interface with a Local Area Network (LAN), Wide Area Network (WAN) or the Internet through a variety of connections including, but not limited to, standard telephone lines, LAN or WAN links (e.g. 802.11, T1, T3, 56 kb, X.25), broadband connections (e.g. ISDN, Frame Relay, ATM), wireless connections, controller area network (CAN), or some combination of any or all of the above. The network interface 1512 may comprise a built-in network adapter, network interface card, personal computer memory card international association (PCMCIA) network card, card bus network adapter, wireless network adapter, universal serial bus (USB) network adapter, modem or any other device suitable for interfacing the computing device 1500 to any type of network capable of communication and performing the operations described herein.

Moreover, the computing device 1500 may be any computer system such as a workstation, desktop computer, server, laptop, handheld computer or other form of computing or telecommunications device that is capable of communication and that has sufficient processor power and memory capacity to perform the operations described herein.

The computing device 1500 may run an operating system, such as any of the versions of the Microsoft® Windows® operating systems, different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Exemplary embodiments may be provided as one or more computer-executable programs embodied on or in one or more computer-readable mediums. The mediums may be, but are not limited to, a hard disk, a compact disc, a digital versatile disc, a flash memory card, a programmable read only memory (PROM), a random access memory (RAM), a read only memory (ROM), magnetoresistive random access memory (MRAM), a magnetic tape, or even the genome in a cell nucleus. In general, the computer-executable programs may be implemented in any programming language. Some examples of programming languages that may be used include the MATLAB software, Python, C, C++, C#, Java™, JavaScript™ etc. Furthermore, the computer-executable programs may be implemented in a hardware description language (HDL) or any other language that allows prescribing computations, such as Deoxyribonucleic acid (DNA). The computer-executable programs may be stored on or in one or more mediums as object code.

Exemplary Distributed System

Figure 16:
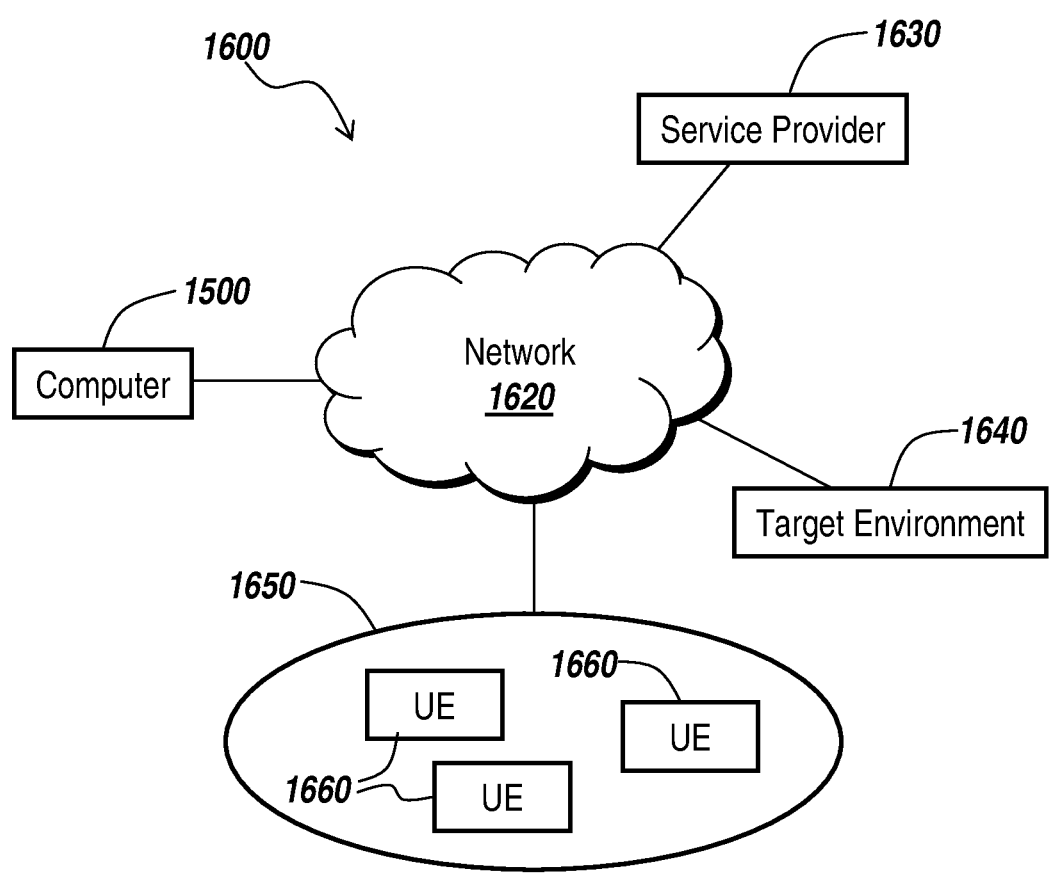
FIG. 16 illustrates an exemplary distributed implementation of exemplary embodiments.

FIG. 16 illustrates an exemplary distributed implementation of exemplary embodiments. System 1600 may include the computer 1500, a network 1620, a service provider 1630, a target environment 1640, and a cluster 1650. The embodiment of FIG. 16 is exemplary, and other embodiments may include more devices, fewer devices, or devices in arrangements that differ from the arrangement of FIG. 16.

The network 1620 may transport data from a source to a destination. Embodiments of the network 1620 may use network devices, such as routers, switches, firewalls, and/or servers (not shown) and connections (e.g. links) to transport data. "Data," as used herein, may refer to any type of machine-readable information having substantially any format that may be adapted for use in one or more networks and/or with one or more devices (e.g. computer 1500, service provider 1630, etc.). Data may include digital information or analog information. Data may further be packetized and/or non-packetized.

The network 1620 may be a hardwired network using wired conductors and/or optical fibers and/or may be a wireless network using free-space optical, radio frequency (RF), and/or acoustic transmission paths. In an exemplary implementation, the network 1620 may be a substantially open public network, such as the Internet. In another exemplary implementation, the network 1620 may be a more restricted network, such as a corporate virtual network. The network 1620 may include Internet, intranet, LAN, WAN, metropolitan area network (MAN), wireless network (e.g. using IEEE 802.11, Bluetooth, etc.), etc. The network 1620 may use middleware, such as common object request broker architecture (CORBA) or distributed component object model (DCOM). Implementations of networks and/or devices operating on networks described herein are not limited to any particular data type, protocol, architecture/configuration, etc.

The service provider 1630 may include a device that makes a service available to another device. For example, the service provider 1630 may include an entity (e.g. an individual, a corporation, an educational institution, a government agency, etc.) that provides one or more services to a destination using a server and/or other devices. These services may include instructions that are executed by a destination to perform an operation (e.g. an optimization operation). Alternatively, a service may include instructions that are executed on behalf of a destination to perform an operation on the destination's behalf.

The target environment 1640 may include a device that receives information over the network 1620. For example, the target environment 1640 may be a device that receives user input from the computer 1500 for providing non-literal representations of code.

The cluster 1650 may include a number of units of execution (UEs) 1660, and may perform processing on behalf of the computer 1500 and/or another device, such as the service provider 1630. For example, in an exemplary embodiment, the cluster 1650 may perform parallel processing on an operation received from the computer 1500. The cluster 1650 may include UEs 1660 that reside on a single device or chip or that reside on a number of devices or chips.

The units of execution (UEs) 1660 may include processing devices that perform operations on behalf of a device, such as a requesting device. In an exemplary embodiment, a UE may be a microprocessor, FPGA, and/or another type of processing device. Embodiments of UE 1660 may include code, such as code for an operating environment. For example, a UE 1660 may run a portion of an operating environment that pertains to parallel processing activities. In an exemplary embodiment, the service provider 1630 may operate the cluster 1650 and may provide interactive optimization capabilities to the computer 1000 on a subscription basis (e.g. via a web service).

The units of execution (UEs) may provide remote/distributed processing capabilities for our products, such as the MATLAB software from The MathWorks, Inc. A hardware unit of execution may include a device (e.g. a hardware resource) that performs and/or participates in parallel programming activities. For example, a hardware unit of execution may perform and/or participate in parallel programming activities in response to a request and/or a task it has received (e.g. received directly or via a proxy). A hardware unit of execution may perform and/or participate in substantially any type of parallel programming (e.g. task, data, stream processing, etc.) using one or more devices. For example, in one implementation, a hardware unit of execution may include a single processing device that includes multiple cores, and in another implementation, the hardware unit of execution may include a number of processors. A hardware unit of execution may also be a programmable device, such as an FPGA, an ASIC, a DSP, etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g. a technical computing environment, a worker, a lab, etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution. Embodiments of a software unit of execution may support one or more threads and/or processes when performing processing operations.

The term "parallel programming" includes multiple types of parallel programming, e.g. task parallel programming, data parallel programming, and stream parallel programming. Parallel programming may include any type of processing that can be distributed across two or more resources (e.g. software units of execution, hardware units of execution, processors, microprocessors, clusters, labs, etc.) and be performed at substantially the same time. For example, in one implementation, parallel programming may refer to task parallel programming where a number of tasks are processed at substantially the same time on a number of software units of execution. In task parallel programming, each task may be processed independently of other tasks executing at the same time (e.g. a first software unit of execution executing a first task may not communicate with a second software unit of execution executing a second task). In another implementation, parallel programming may refer to data parallel programming, where data (e.g. a data set) is parsed into a number of portions that are executed in parallel using two or more software units of execution. In data parallel programming, the software units of execution and/or the data portions may communicate with each other as processing progresses. In still another implementation, parallel programming may refer to stream parallel programming (also referred to as pipeline parallel programming). Stream parallel programming may use a number of software units of execution arranged in series (e.g. a line) where a first software unit of execution produces a first result that is fed to a second software unit of execution that produces a second result. Stream parallel programming may also include a state where task allocation may be expressed in a directed acyclic graph (DAG) or a cyclic graph with delays). Other implementations may combine two or more of task, data, or stream parallel programming techniques alone or with other types of processing techniques to form hybrid-parallel programming techniques.

CONCLUSION

Exemplary embodiments may provide methods, systems and devices for providing non-literal representations of source code. Exemplary embodiments may allow identification of one or more portions of source code, and may output each identified portion in its non-literal representation, i.e. in a simplified and/or descriptive form. These non-literal representations only change the way the identified portions are output in order to improve readability of the source code, and do not modify the underlying structure or semantics of the source code.

While improving readability of the source code, the non-literal representations may also retain important information about the underlying source code. Examples of information may include, but are not limited to, one or more inputs and/or outputs of the underlying source, a name for the representation, a tag describing the task performed by the underlying source code, and additional information appropriate for the underlying source code, the application or the programming language, e.g. exceptions which may be thrown by the underlying source code.

Exemplary embodiments may be provided integrally with an existing integrated development environment (IDE). Exemplary embodiments may also be provided as a stand-alone application.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of acts have been described in connection with FIGS. 3, 4 and 7, the order of the acts may be modified in other implementations consistent with the principles of the invention. Further, non-dependent acts may be performed in parallel.

In addition, implementations consistent with principles of the invention may be implemented using devices and configurations other than those illustrated in the figures and described in the specification, without departing from the spirit of the invention. Devices and/or components may be added and/or removed from the implementations of the figures depending on specific deployments and/or applications. Also, disclosed implementations may not be limited to any specific combination of hardware.

Furthermore, certain portions of the invention may be implemented as logic that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. In addition, the phrase "based on," as used herein, is intended to mean "based, at least in part, on" unless explicitly stated otherwise.

The scope of the invention is defined by the claims and their equivalents.

I claim:

1. One or more non-transitory computer-readable media storing one or more computer-executable instructions for:
   providing code in an integrated development environment (IDE);
   identifying a portion of the code;
   receiving a non-literal representation for outputting the portion of code on an output device from a user, the non-literal representation representing semantics of the portion of the code;
   configuring outputting of the portion of the code to specify whether, on opening a file containing the code, the portion of the code is to be output as pseudocode or as the portion of the code;
   opening the file containing the code; and
   outputting, based on the configuring, the portion of the code either as the portion of the code or the pseudocode, the outputting occurring without changing the portion of the code.

2. One or more non-transitory computer-readable media storing one or more computer-executable instructions for:
   receiving an identification of a portion of code from a user;
   receiving a non-literal representation for outputting the portion of code on an output device from the user, the non-literal representation representing semantics of the portion of the code;
   configuring outputting of the portion of the code to specify whether, on opening a file containing the code, the portion of the code is to be output as the non-literal representation or as the portion of the code;
   opening the file containing the code; and
   outputting, based on the configuring, the portion of the code either as the portion of the code or the non-literal representation, the outputting occurring without changing the portion of the code.

3. The one or more non-transitory computer-readable media of claim 2, wherein the non-literal representation is:
   a condensed version of the portion of the code,
   a textual description of the portion of the code,
   a symbolic representation of the portion of the code, or
   a mock call to a programming unit.

4. The one or more non-transitory computer-readable media of claim 2, wherein the non-literal representation includes:
   one or more inputs of the portion of the code,
   one or more outputs of the portion of the code,
   a name for the non-literal representation,
   a tag for a task performed by the portion of the code, or
   information on exceptions that may be thrown by the portion of the code.

5. The one or more non transitory computer-readable media of claim 4, further comprising one or more instructions for:
   including the tag for the task performed by the portion of the code; and
   changing an appearance of the non-literal representation of the portion of the code upon inclusion of the tag.

6. The one or more non-transitory, computer-readable media of claim 4, further comprising one or more instructions for:
   allowing the user to specify a particular task in the code that is to be deleted or suppressed when the code is compiled or executed; and
   deleting or suppressing the portion of the code when the code is compiled or executed, if the tag associated with the non-literal representation of the portion of the code specifies the particular task.

7. The one or more non-transitory computer-readable media of claim 4, further comprising one or more instructions for:
   automatically determining the one or more inputs or the one or more outputs of the portion of the code using standard flow analysis techniques; and
   allowing the user to edit the one or more inputs or the one or more outputs determined automatically.

8. The one or more non-transitory computer-readable media of claim 2, further comprising one or more instructions for:
   exposing or hiding the portion of the code in an output of the code in response to user input.

9. The one or more non-transitory computer-readable media of claim 2, further comprising one or more instructions for:
   editing the non-literal representation of the portion of the code.

10. The one or more non-transitory computer-readable media of claim 2, further comprising one or more instructions for:
    deleting the non-literal representation of the portion of the code.

11. The one or more non-transitory computer-readable media of claim 2, further comprising one or more instructions for:
    providing a user interface to allow the user to identify the portion of the code.

12. The one or more non-transitory computer-readable media of claim 2, further comprising one or more instructions for:
    identifying one or more special features in the code, the one or more special features applying to the portion of the code; and
    automatically identifying the portion of the code based on a scope of application of the one or more special features.

13. The one or more non-transitory computer-readable media of claim 2, further comprising one or more instructions for:
    performing an analysis of usage of the code or underlying programming units in the code to automatically identify the portion of the code.

14. The one or more non-transitory computer-readable media of claim 13, further comprising one or more instructions for:
    allowing the user to confirm the identifying of the portion of the code.

15. The one or more non-transitory computer-readable media of claim 2, wherein receiving the non-literal representation further comprises instructions for:
- receiving a format or a content of the non-literal representation; and
- creating an association between the portion of the code and the non-literal representation.

16. The one or more non-transitory computer-readable media of claim 2, wherein receiving the non-literal representation further comprises instructions for:
- providing a user interface to allow the user to provide or modify the non-literal representation.

17. The one or more non-transitory computer-readable media of claim 2, wherein receiving the non-literal representation further comprises instructions for:
- identifying one or more special features in the code, the one or more special features applying to the portion of the code; and
- automatically setting the one or more special features to be the non-literal representation of the portion of the code.

18. The one or more non-transitory computer-readable media of claim 17, wherein the one or more special features are pragmas or special comments in the code.

19. The one or more non-transitory computer-readable media of claim 17, further comprising one or more instructions for:
- extending a syntax of a programming environment to define the one or more special features.

20. The one or more non-transitory computer-readable media of claim 2, further comprising one or more instructions for:
- receiving a security level for the user of the code, the security level indicating whether the user has access to an output of the portion of the code;
- outputting the portion of the code if the user has access to the output of the portion of the code; and
- outputting the portion of the code only as the non-literal representation if the user does not have access to the output of the portion of the code.

21. The one or more non-transitory computer-readable media of claim 2, further comprising one or more instructions for:
- converting the non-literal representation into a new programming unit so that the new programming unit becomes part of the code.

22. The one or more non-transitory computer-readable media of claim 2, further comprising one or more instructions for:
- reusing the non-literal representation from a first location in the code to a second location in the code.

23. The one or more non-transitory computer-readable media of claim 22, wherein the reusing does not instantiate a new programming unit for the non-literal representation.

24. The one or more non-transitory computer-readable media of claim 22, further comprising one or more instructions for:
- editing the non-literal representation at the second location; and
- enabling the user to control whether the editing will be applied at only the second location or at both the first and second locations.

25. The one or more non-transitory computer-readable media of claim 2, wherein the portion of the code is identified in a source code editor.

26. The one or more non-transitory computer-readable media of claim 2, wherein the non-literal representation is output in a source code editor on the output device.

27. The one or more non-transitory computer-readable media of claim 2, wherein an association between the portion of the code and the non-literal representation is stored on a storage device.

28. The one or more non-transitory computer-readable media of claim 2, wherein:
- the portion of the source code is identified in a source code editor of a stand-alone application, the stand-alone application independent of an integrated development environment (IDE); and
- the non-literal representation is output in the source code editor of the stand-alone application.

29. In a computer implementing a programming environment, a computer-implemented method comprising:
- providing code in an integrated development environment (IDE);
- identifying a portion of the code;
- providing, using a computer, pseudocode associated with the portion of the code;
- receiving a non-literal representation for outputting the portion of code on an output device from a user, the non-literal representation representing semantics of the portion of the code;
- configuring outputting of the portion of the code to specify whether, on opening a file containing the code, the portion of the code should be output as the pseudocode or as the portion of the code; and
- opening the file containing the code, such that the portion of the code is output either as the pseudocode or as the portion of the code based on the configuring, where outputting the portion of the code as the pseudocode leaves the portion of the code unchanged.

30. In a computer implementing a programming environment, a computer-implemented method comprising:
- receiving an identification of a portion of code from a user;
- receiving a non-literal representation for outputting the portion of code on an output device from the user, the non-literal representation representing semantics of the portion of the code;
- configuring outputting of the portion of the code to specify whether, on opening a file containing the code, the portion of the code should be output as the non-literal representation or as the portion of the code; and
- opening the file containing the code, such that the portion of the code is output either as the non-literal representation or as the portion of the code based on the configuring, where outputting the portion of the code as the non-literal representation leaves the portion of the code unchanged.

31. The method of claim 30, wherein the non-literal representation is a condensed version of the portion of the code, a textual description of the portion of the code, a symbolic representation of the portion of the code, or a mock call to a programming unit.

32. The method of claim 30, wherein the non-literal representation includes one or more inputs of the portion of the code, one or more outputs of the portion of the code, a name for the non-literal representation, a tag for a task performed by the portion of the code, or information on exceptions that may be thrown by the portion of the code.

33. The method of claim 32, further comprising:
- including the tag for the task performed by the portion of the code; and
- changing an appearance of the non-literal representation of the portion of the code upon inclusion of the tag.

34. The method of claim 32, further comprising:
allowing the user to specify a particular task in the code that is to be deleted or suppressed when the code is compiled or executed; and
deleting or suppressing the portion of the code when the code is compiled or executed, if the tag associated with the non-literal representation of the portion of the code specifies the particular task.

35. The method of claim 32, further comprising:
automatically determining the one or more inputs or the one or more outputs of the portion of the code using standard flow analysis techniques; and
editing the one or more inputs or the one or more outputs determined automatically based on user input.

36. The method of claim 30, further comprising:
enabling the user to expose or hide the portion of the code in an output of the code.

37. The method of claim 30, further comprising:
editing the non-literal representation of the portion of the code.

38. The method of claim 30, further comprising:
deleting the non-literal representation of the portion of the code.

39. The method of claim 30, wherein identifying the portion of the code further comprises:
providing a user interface to allow the user to identify the portion of the code.

40. The method of claim 30, wherein identifying the portion of the code further comprises:
identifying one or more special features in the code, the one or more special features applying to the portion of the code; and
automatically identifying the portion of the code based on a scope of application of the one or more special features.

41. The method of claim 30, wherein identifying the portion of the code further comprises:
performing an analysis of usage of the code or underlying programming units in the code to automatically identify the portion of the code.

42. The method of claim 41, further comprising:
confirming the identifying of the portion of the code based on a user input.

43. The method of claim 30, wherein receiving the non-literal representation further comprises:
receiving a format or a content of the non-literal representation; and
creating an association between the portion of the code and the non-literal representation.

44. The method of claim 30, wherein receiving the non-literal representation further comprises:
providing a user interface to allow the user to provide or modify the non-literal representation.

45. The method of claim 30, wherein receiving the non-literal representation further comprises:
identifying one or more special features in the code, the one or more special features applying to the portion of the code; and
automatically setting the one or more special features to be the non-literal representation of the portion of the code.

46. The method of claim 45, wherein the one or more special features are pragmas or special comments in the code.

47. The method of claim 43, further comprising:
extending a syntax of the programming environment to define the one or more special features.

48. The method of claim 30, further comprising:
receiving a security level for the user of the code, the security level indicating whether the user has access to an output of the portion of the code;
outputting the portion of the code if the user has access to the output of the portion of the code; and
outputting the portion of the code only as the non-literal representation if the user does not have access to the output of the portion of the code.

49. The method of claim 30, further comprising:
converting the non-literal representation into a new programming unit so that the new programming unit becomes part of the code.

50. The method of claim 30, further comprising:
reusing the non-literal representation from a first location in the code to a second location in the code.

51. The method of claim 50, wherein the reusing does not instantiate a new programming unit for the non-literal representation.

52. The method of claim 50, further comprising:
editing the non-literal representation at the second location; and
controlling whether the editing will be applied at only the second location or at both the first and second locations based on user input.

53. The method of claim 30, wherein the programming environment is a dynamically-typed programming environment.

54. The method of claim 30, wherein the portion of the code is identified in a source code editor.

55. The method of claim 30, wherein the non-literal representation is output in a source code editor on the output device.

56. The method of claim 30, wherein an association between the portion of the code and the non-literal representation is stored on a storage device.

57. The method of claim 30, wherein:
the programming environment provides an integrated development environment (IDE);
the portion of the code is identified in a source code editor of the IDE; and
the non-literal representation is output in the source editor of the IDE.

58. The method of claim 30, wherein:
the portion of the source code is identified in a source code editor of a stand-alone application, the stand-alone application independent of an integrated development environment (IDE); and
the non-literal representation is output in the source code editor of the stand-alone application.

59. A system comprising:
a hardware processor configured to:
provide a code,
provide a non-literal representation for outputting a portion of the code, the non-literal representation representing semantics of the portion of the code, and
configuring outputting of the portion of the code to specify whether, on opening a file containing the code, the portion of the code is to be output as the non-literal representation or as the portion of the code;
opening the file containing the code; and
outputting, based on the configuring, the portion of the code either as the portion of the code or the non-literal representation without changing the portion of the code; and an output device for outputting, based on the configuring, the portion of the code either as the portion of the code or the non-literal representation, the outputting occurring without changing the portion of the code.

60. The system of claim 59, wherein the non-literal representation is a condensed version of the portion of the code, a textual description of the portion of the code, a symbolic representation of the portion of the code, or a mock call to a programming unit.

61. The system of claim 60, wherein the non-literal representation includes one or more inputs of the portion of the code, one or more outputs of the portion of the code, a name for the non-literal representation, a tag for a task performed by the portion of the code, or information on exceptions that may be thrown by the portion of the code.

62. The system of claim 59, further comprising:
a storage device for storing the non-literal representation of the portion of the code.

* * * * *